United States Patent [19]
Maguire et al.

[11] Patent Number: 5,943,500
[45] Date of Patent: Aug. 24, 1999

[54] LONG LATENCY INTERRUPT HANDLING AND INPUT/OUTPUT WRITE POSTING

[75] Inventors: David J. Maguire, Spring, Tex.; James R. Edwards, Longmont, Colo.

[73] Assignee: Compaq Computer Corporation, Houston, Tex.

[21] Appl. No.: 08/684,485

[22] Filed: Jul. 19, 1996

[51] Int. Cl.[6] .................................................. G06F 9/46
[52] U.S. Cl. ...................... 395/733; 395/868; 395/734; 395/733; 395/736; 395/725; 395/425; 395/750; 380/4
[58] Field of Search .................... 395/739, 740, 395/733, 306, 868, 275, 750, 550, 425, 725; 371/66; 364/200

[56] References Cited

U.S. PATENT DOCUMENTS

| | | | |
|---|---|---|---|
| 5,237,692 | 8/1993 | Raasch et al. | 395/739 |
| 5,327,545 | 7/1994 | Begun et al. | 711/133 |
| 5,555,413 | 9/1996 | Lohman et al. | 395/740 |
| 5,568,649 | 10/1996 | MacDonald et al. | 395/733 |
| 5,588,125 | 12/1996 | Bennet | 395/868 |
| 5,613,126 | 3/1997 | Smidt | 395/306 |
| 5,613,128 | 3/1997 | Nizar et al. | 395/733 |
| 5,701,496 | 12/1997 | Nizar et al. | 395/739 |

OTHER PUBLICATIONS

Serialized IRQ on the "PCIway", Aug. 2, 1995, Version 5.4, Preliminary.
Serialized IRO Support for PCI Systems, Sep. 1, 1995, Rev. 6.0.
*Electronic Engineering Times*, Intel'Triton Goes Portable, p. 106, Oct. 9, 1995.
intel® Peripheral Components, 3–195 to 3–214, Oct. 1988.

*Primary Examiner*—Parshotam S. Lall
*Assistant Examiner*—Khanh Quang Dinh
*Attorney, Agent, or Firm*—Akin, Gump, Strauss, Hauer & Feld, L.L.P.

[57] ABSTRACT

An apparatus handles long latency interrupt signals in a computer which posts I/O write operations. The apparatus includes a posting buffer for posting write operations and circuitry for ensuring that End-of-Interrupt (EOI) write operations (and other interrupt controller directed I/O operations) are properly synchronized to prevent false interrupts from reaching the processor. Upon receipt of the EOI write operation, the apparatus verifies that the posting buffer is empty before it imposes a pre-determined delay to ensure sufficient time for the cleared the interrupt signal to be transmitted over the interrupt serial bus. Next, the apparatus checks the interrupt serial bus for activities. If the interrupt serial bus is idle, the EOI write operation is issued to the interrupt controller. Alternatively, the apparatus waits until the serial bus becomes inactive for two back-to-back cycles before allowing the EOI write operation to be issued to the interrupt controller. The back-to-back wait requirement prevents false interrupts from being generated in the event that the cleared interrupt may have missed its transmission window over the current interrupt serial bus cycle, or the event that the cleared interrupt was delayed by any interrupt serial bus transmission latencies.

35 Claims, 17 Drawing Sheets

5,943,500

LONG LATENCY INTERRUPT HANDLING AND INPUT/OUTPUT WRITE POSTING

BACKGROUND OF THE INVENTION

1. Field of the Invention

The invention relates to the handling of interrupt signals, and more particularly, to the handling of long latency interrupt signals in a computer with an input/output (I/O) write posting capability.

2. Description of the Related Art

The growth of the personal computer industry is attributable in part to the availability of low cost, yet powerful computers. Improvements in processor, memory and data storage capabilities have resulted in light-weight, powerful mobile computers such as portables, luggables, laptops, notebooks, palmtops and personal digital assistants. These computers can provide sufficient processing capability for audio visual applications such as computer aided design, three-dimensional animation, and multimedia presentation even when users are at remote locations.

Although mobile users want lightweight and compact computers for their mobile computing requirements, they also want the ability to accept a broad range of peripherals via expansion buses such as the Industry Standard Architecture (ISA) bus, the Extended Industry Standard Architecture (EISA) bus, or the Peripheral Component Interconnect (PCI) bus. However, due to weight, space and power consumption limits imposed by the physical structure of the portable computer, the portable computer cannot provide the same expandability as the desktop computer. One method of providing expandability for portable computers without sacrificing size, weight and battery life is through an expansion base unit. The expansion base unit is a non-portable unit that operates from AC power. When the user is at his or her home-base, he or she simply plugs the portable computer into the expansion base unit to access the additional peripherals. For example, the expansion unit may have a network interface card (NIC) for connecting to a local area network, a large capacity disk drive for additional data storage, and other expansion cards that do not need to be on the portable computer itself.

Although the connection between the portable computer and the expansion base unit may be accomplished via a proprietary bus, an alternate route is to connect the two units via the standard expansion bus itself to minimize translations from the standard expansion bus and back. In this manner, the expansion base unit adds a second bus that is an extension of the portable's standard expansion bus, effectively increasing the number of slots available to accept expansion cards to the entire computer system. However, the possibility that peripherals on both buses can be mapped into the same addresses complicates the process of accessing individual peripherals when the portable computer is docked to the base unit because of the potential conflicts.

One such interaction involves interrupt signals. In conventional computer systems, hardware devices such as a keyboard or a serial port can request servicing on a timely basis. Although the central processing unit (CPU) can periodically poll each peripheral to ensure that requests are timely serviced, an interrupt approach is more efficient because it allows the microprocessor to execute its main program and to service peripheral devices only when requested by the device itself. The interrupt approach typically uses a programmable interrupt controller (PIC) coupled to the system bus to function as an overall manager in accepting interrupt requests from the I/O devices. In typical personal computer (PC) systems compatible with those made by International Business Machines Corporation, the PIC receives interrupts over the ISA expansion bus and appropriately pulses the interrupt input of the processor. The processor completes the currently executing instruction, issues an interrupt acknowledge signal to the PIC and then executes a service routine to service the requesting device. Once the interrupt has been serviced, the processor writes an End-of-Interrupt (EOI) input/output (I/O) command to the PIC and continues processing where it left off. The EOI command is typically sent through an I/O instruction to a register within the PIC.

In the multi-bused environment presented by the portable computer-expansion unit combination, the interrupt system must properly process the interrupts from each bus, behaving to the software as though only one bus exists to remain compatible with the vast base of software for the IBM PC. Further, the interrupt mechanism should minimize the number of signals required to be transmitted to minimize the pin-out, wiring, and connector costs associated with communicating these signals. To address these requirements, a new interrupt bus architecture known as the interrupt serial (IRQSER) bus was recently developed where peripherals and devices on ISA, EISA or PCI buses can transfer interrupt and other information from one system component to a system host controller in a time divisioned manner. Peripheral devices sample the serial bus and gate the interrupt signal onto the serial bus at the appropriate time to send their interrupt requests. In this manner, the serial bus is an independent channel apart from the ISA bus, EISA bus, or PCI bus for transmitting interrupt requests.

Although the interrupt serial bus provides a low cost method for flexibly communicating interrupt signals from a variety of sources to the interrupt controller, the serial nature of the interrupt bus creates a potential latency problem. In a typical interrupt scheme, a device asserts an interrupt request (IRQ) signal to request servicing. The IRQ signal instructs the interrupt controller to interrupt the CPU, which interrupts its interrupt service routine. The device responds by deasserting the IRQ signal, so the interrupt controller then knows the device is no longer requesting an interrupt.

But further, the interrupt controller then must also keep track of when the CPU has finished processing the current device's interrupt. It does so by maintaining a register that is written to by an End of Interrupt I/O command from the CPU, which the CPU's interrupt service routine writes immediately before exiting.

The problem arises because of the delay between when the CPU clears the device's interrupt by an I/O operation to an appropriate register and when the interrupt controller becomes aware that the device is no longer requesting an interrupt. Assume that the interrupt service routine clears the device's interrupt and then immediately sends an EOI command to the PIC. Although the device has dropped its interrupt request, that information has not passed over the interrupt serial bus IRQSER, so the interrupt controller believes the device is still asserting its IRQ signal. But then, the interrupt controller receives the EOI signal from the CPU. The interrupt controller then initiates another interrupt—this time a spurious interrupt—because the IRQ still appears asserted. Similar latency related problems can arise through missequencing of other device related signals to the PIC versus CPU I/O operations with the PIC. For example, the CPU may read the IRR, or interrupt request register before that register reflects a changed state of the requesting devices.

One solution to the latency problem is to delay the EOI signal (or other PIC related I/O operation) to the interrupt controller by the same amount of time as the maximum IRQSER cycle latency, ensuring that the events do not occur out of order. However, such delay is undesirable from a performance viewpoint. It is desirable that the write of the EOI command be presented to the PIC after the interrupt signal corresponding to the EOI has been cleared to ensure correct sequencing of the interrupt signal, but without unnecessarily delaying that operation.

SUMMARY OF THE INVENTION

An apparatus is provided for handling long latency interrupt signals in a computer which posts I/O write operations. The apparatus includes a posting buffer for posting write operations and circuitry for ensuring that I/O operations between the processor and the interupt controller are properly synchronized to prevent false interrupts or inaccurate data from reaching the processor. Initially, the interrupt signals from various devices are serialized and transmitted over the interrupt serial bus to an interrupt controller, which interrupts the processor upon an interrupt request, causing an interrupt handling routine to be executed. At the end of the interrupt handling routine, the processor performs an I/O write of an EOI command to the interrupt controller. Upon receipt of a write operation that may be an EOI command, the controller verifies that the posting buffer for posting I/O writes to the expansion bus is empty. Such an I/O write could be the I/O operation necessary to clear the interrupt of the interrupting device. When this posting buffer is clear, the controller then imposes a pre-determined delay to ensure sufficient time for any cleared interrupt signal to be transmitted over the interrupt serial bus. Next, the controller checks the interrupt serial bus for activity. If the interrupt serial bus is idle, the I/O write operation that may be an EOI command is issued to the interrupt controller. Alternatively, the controller waits until the serial bus becomes inactive for two back-to-back cycles before allowing the EOI command to be written to the interrupt controller. The back-to-back wait requirement prevents false interrupts from being generated should the cleared interrupt miss its transmission window over the current interrupt serial bus cycle, or should the cleared interrupt be delayed by any interrupt serial bus transmission latencies. System performance is thus enhanced because I/O write operations are posted. The write posting capability allows the processor to execute the next instruction while the current write operation is still occurring. Further, the ability to write EOI commands immediately after the serial bus becomes idled allows the EOI operations to be performed within one interrupt serial cycle, thus enhancing performance. In addition, by ensuring that writes of EOI commands are properly sequenced, the present invention prevents spurious interrupts from reaching the processor.

Other I/O operations with the PIC are similarly handled. When an I/O operation is directed to the PIC, it is first determined that the write posting buffer is empty, followed by a delay or by waiting for an inactive serial bus for two back-to-back cycles. In this way, the PIC will accurately reflect the state of its connected devices before it provides device related information in response to a PIC related I/O command.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,486, entitled "BUS SYSTEM FOR SHADOWING REGISTERS," by Dwight D. Riley and David J. Maguire, filed concurrently herewith (now U.S. Pat. No. 5,793,995);

U.S. application Ser. No. 08/684,412 still pending, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,710 (U.S. Pat. No. 5,748,911 now), entitled "SERIAL BUS SYSTEM FOR SHADOWING REGISTERS," by David J. Maguire and Hung Q. Le, filed concurrently herewith;

U.S. application Ser. No. 08/684,584 (U.S. Pat. No. 5,864,688), entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316 U.S. Pat. No. 5,781,748, entitled "TWO ISA BUS CONCEPT," by Gregory N. Santos, James R. Edwards, Dwight D. Riley and David J. Maguire, filed concurrently herewith;

U.S. application Ser. No. 08/684,490 U.S. Pat. No. 5,761,460, entitled "RECONFIGURABLE DUAL MASTER IDE INTERFACE," by Gregory N. Santos, David J. Maguire, William C. Hallowell and James R. Edwards, filed concurrently herewith; and U.S. application Ser. No. 08/684,255 (allowed but does not have pat. No. yet) entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
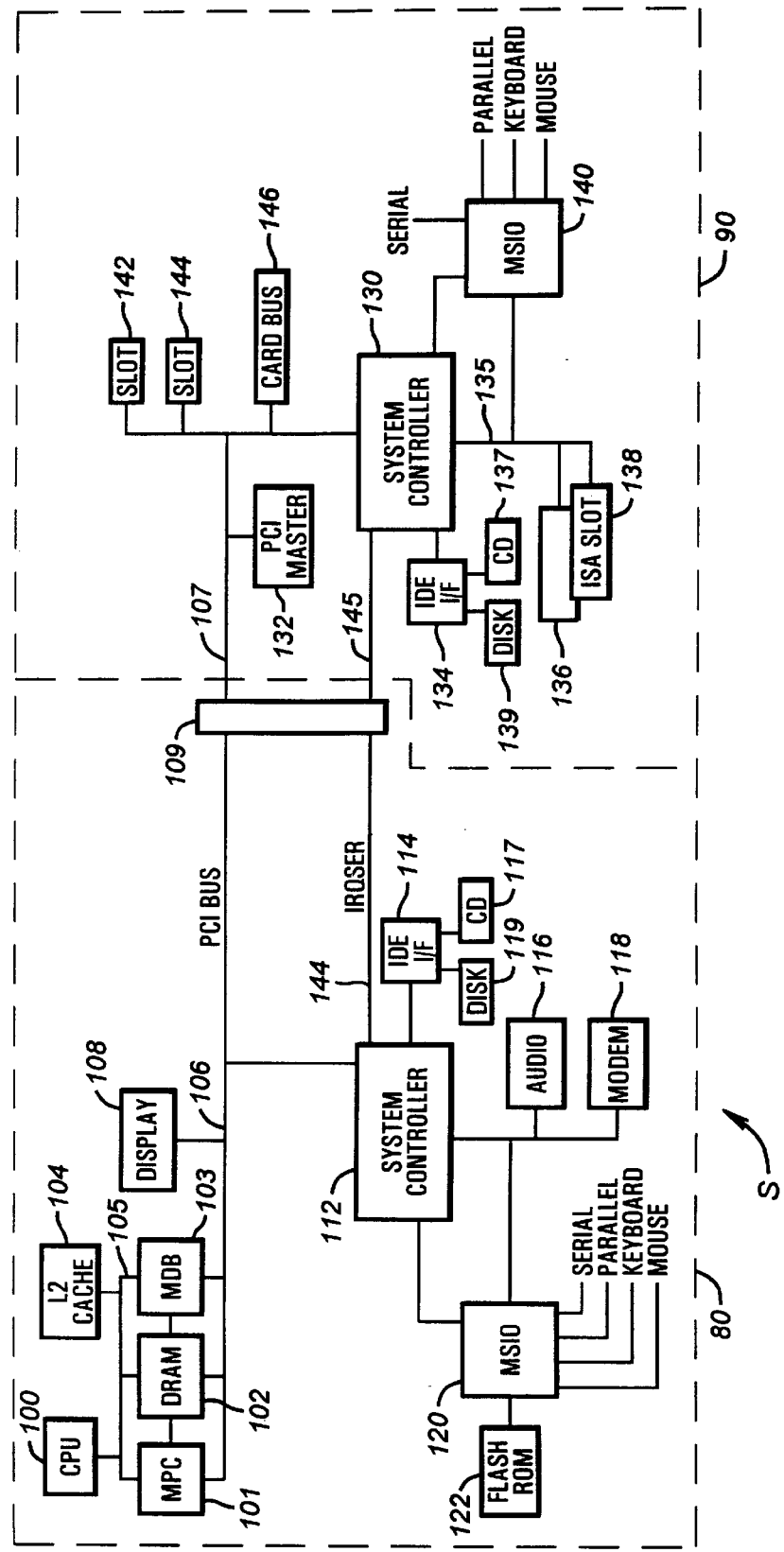
FIG. 1 is a block diagram of a computer system with an interrupt handling device in accordance with the present invention.

Referring now to FIG. 1, a computer system S according to the present invention is shown. In FIG. 1, the system S includes a portable computer 80 and an expansion base unit 90. Within the portable computer 80, a CPU 100 and a level two (L2) cache 104 are connected to a high speed local bus 105. The processor 100 of the preferred embodiment is one of the 80X86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Wash. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller IPC) 101, a dynamic random access memory (DRAW array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A display 108 is also connected to the PCI bus 106.

The PCI bus 106 is also connected to a system controller 112. The system controller 112 is a PCI to ISA bus bridge which also provides various support functions distributed between the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio board 116 and a modem 118 as conventionally present in PC systems to provide sound and data communication capabilities for the system S via a first ISA interface 121. The system controller 112 also provides an IDE interface 114 on the same integrated circuit for driving one or more hard disk drives, preferably a CD-ROM player 117 and a disk drive 119. Further, the system controller 112 provides a single pin output to support an interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port, a serial port, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low $r_{ds}$, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is configured to be the slave upon power up. As a slave, the write posting buffer is not available in the system controller 130. The system controller 130 is connected to the expansion PCI bus 107 and the interrupt serial bus 145. The system controller 130 supports additional drives 137 and 139 through a second IDE interface 134. The system controller 130 also supports an ISA bus 135 which is connected to one or more ISA slots 136 and 138. The system controller 130 is further connected to a second MSIO device 140, which provides a secondary parallel port, serial port, keyboard interface and mouse interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

The plurality of IDE interfaces 114 and 134 on system controllers 112 and 130 provide the capability to expand the data storage capability of the system S. The IDE interfaces 114 and 134 require a mechanism for mapping drives configured in the master-master configuration into a master-slave configuration when the portable computer 80 is docked to the base expansion unit 90 for BIOS compatibility purposes and which remaps the drives back into a master-master mode after the separation of the portable computer 80 from the base expansion unit 90 to ensure optimal performance.

Figure 2A:
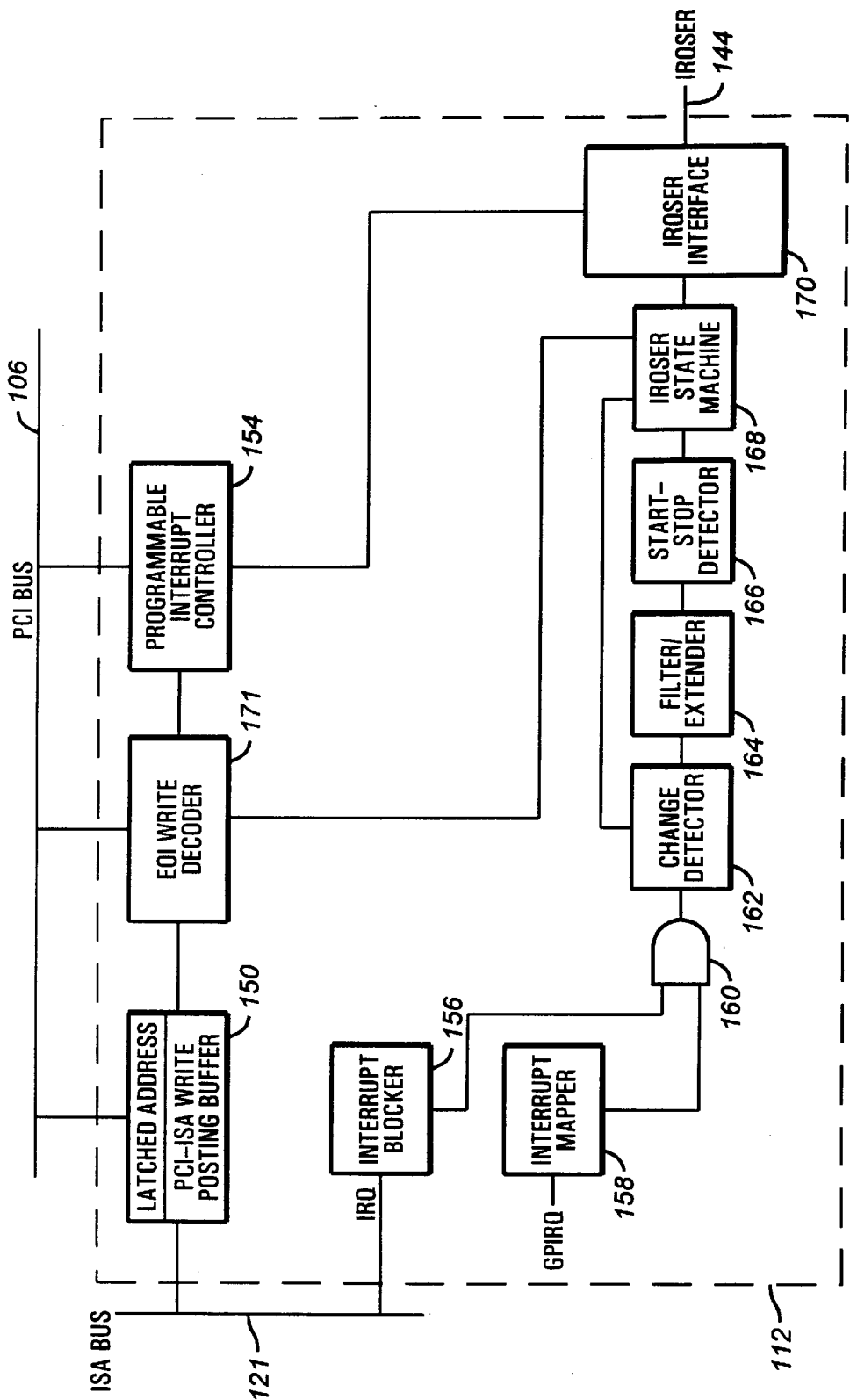
FIG. 2A is a block diagram of the system controller of FIG. 1.

A more detailed diagram of the system controller 112, including the posted I/O write circuitry and the serial bus circuitry, is shown in FIG. 2A. The details and operation of the serial bus interrupt handling mechanism is discussed below in conjunction with FIGS. 10A–20.

Turning now to FIG. 2A, the system controller 112 is a PCI to ISA bridge and is thus connected to the PCI bus 106 as well as the internal ISA bus 121. The system controller 112 is configured to be a master and thus differs from the corresponding system controller 130 which is configured as a slave device. Among other differences, the system controller 112 supports I/O write posting while the system controller 130 does not support I/O write posting.

The system controller 112 of FIG. 2A supports a plurality of devices on-board the portable computer 80, including those connected to the PCI bus 106, the internal ISA bus 121, while the system controller 130 supports a plurality of devices located on the expansion PCI bus 107 and the expansion ISA bus 135 of the expansion base unit 90. These devices may request servicing by the processor 100 from time to time by activating their respective interrupt signals.

The processing of interrupt signals provided to the system controller 112 is discussed next. In the system controller 112, interrupt signals generated by one or more peripherals on the internal ISA bus 121 are provided to an interrupt blocker 156, which selectively masks certain interrupts as defined by an interrupt blocking register (IBR) and passes the remaining interrupts. The IBR is enabled for the system controller 112 and not for the system controller 130. The interrupt signals that are not masked by the interrupt blocker 156 are presented to one input of an AND gate 160. Additionally, the portable computer 80 may have a number of on-board devices and PCI peripherals which generate general purpose interrupt request signals GPIRQ. The GPIRQ signals are provided to an interrupt mapper 158 which can map the general purpose GPIRQs to another interrupt request signal to avoid interfering with interrupt signals already existing on the ISA bus 121. The combination of the blocker 156 and the mapper 158 resolves potential interrupt conflicts that can occur between ISA cards and internally mapped interrupts in the system controllers 112 and 130.

The output of the interrupt mapper 158 is provided to a second input of the AND gate 160. The output of the AND gate 160 is provided to a change detector 162 which detects whether or not an interrupt has been asserted or deasserted on the interrupt serial bus. The change detector 162 is connected to a interrupt serial state machine 168 to process the new interrupt request signal and to eventually forward the new interrupt request signal over the IRQSER bus 144 via an IRQSER interface 170. The output of the change detector 162 is also provided to a filter/extender 164. The filter/extender circuitry in block 164 handles edge sensitive interrupts that go active for less than the maximum latency of the IRQSER bus 144, thus ensuring that short interrupts are captured. The low level extender in filter/extender block 164 captures brief edge sensitive interrupts by causing the extender's output to stay low until the interrupts are transmitted over the IRQSER bus 144. Block 164 also provides high and low filters to eliminate glitches whose pulse-widths are less than a certain number of clock periods, preferably less than two PCI clock periods. The high and low filters of block 164 thus minimize occurrences of spurious interrupts in the system.

The output of the filter/extender block 164 is provided to a start/stop detector 166 which detects the beginning and ending of the start frame and the stop frame of the interrupt serial bus 144. The output of the start/stop detector 166 is provided to an IRQSER state machine 168 which controls the interrupt serial interface 170. The output of the IRQSER state machine 168 is provided to an IRQSER interface 170 which electrically formats and gates the signal in a timely manner onto the interrupt serial bus IRQSER 144. The IRQSER interface 170, when it is in the host mode, further performs the task of serial to parallel conversion to assemble the serial signal from the IRQSER bus 144 into a plurality of parallel interrupt lines, preferably fifteen lines, which are subsequently presented to the parallel interrupt input lines of the programmable interrupt controller 154.

Figure 2B:
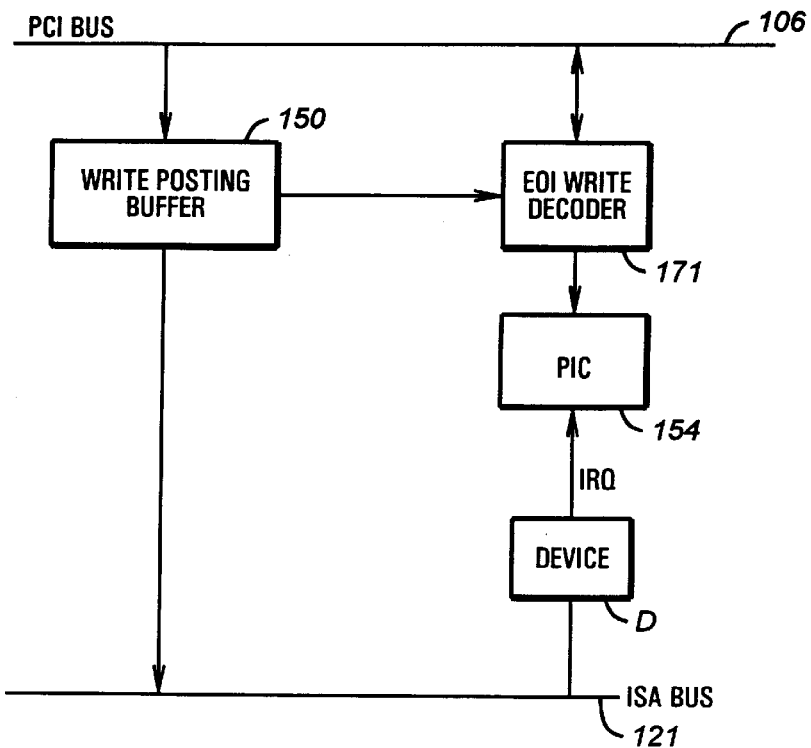
FIG. 2B is a block diagram of the interrupt handling device for handling posted I/O write operations.
Figure 2C:
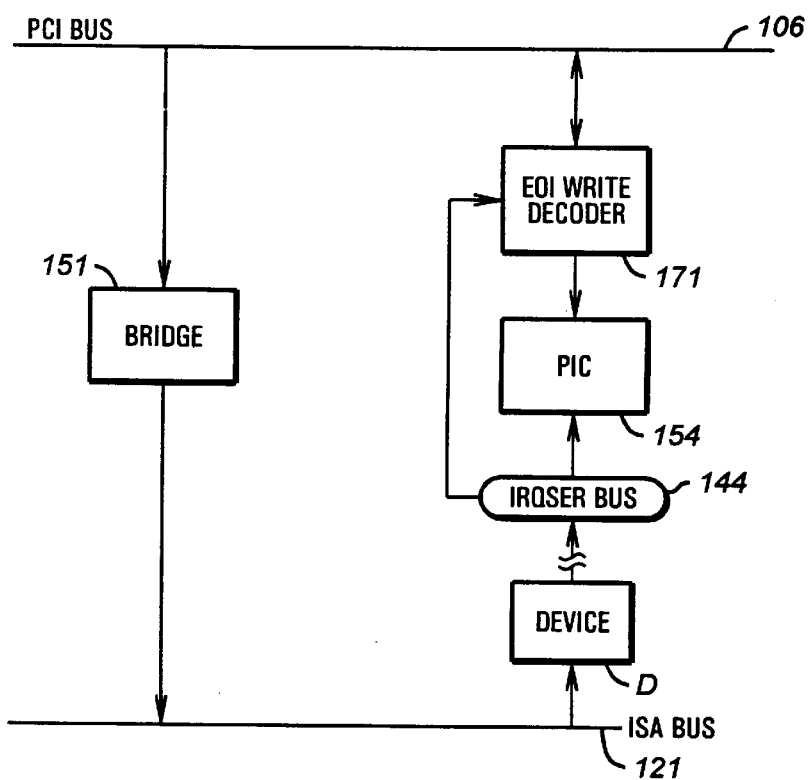
FIG. 2C is a block diagram of the interrupt handling device for handling long latency interrupt cycles.
Figure 2D:
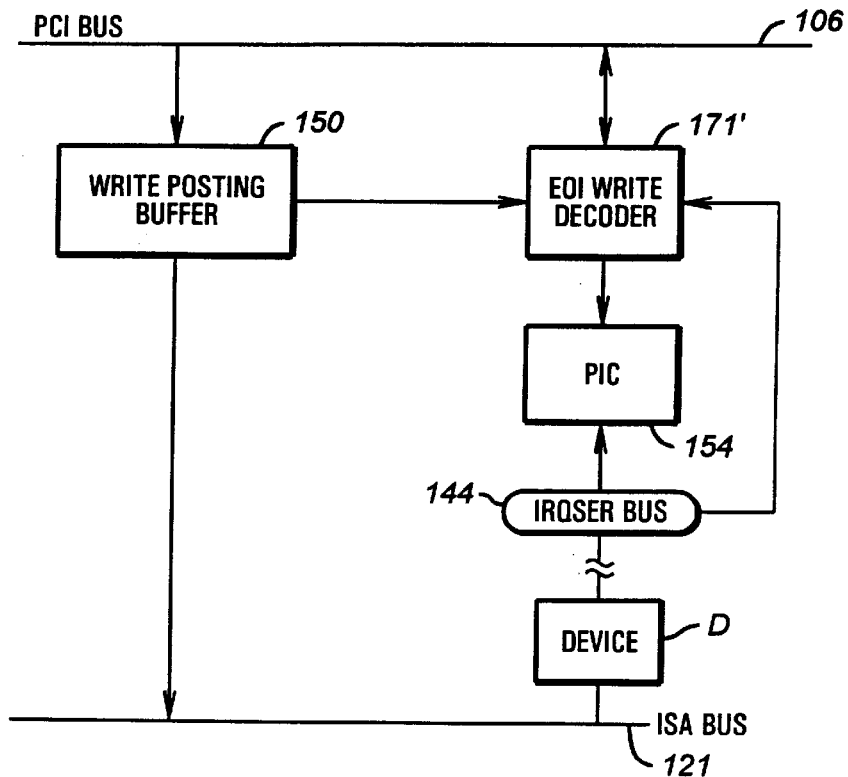
FIG. 2D is a block diagram of the interrupt handling device for handling posted I/O write operations and long latency interrupt cycles.

FIGS. 2B, 2C and 2D show block diagrams for handling posted I/O write operations and for handling long latency interrupt cycles such as those present on the IRQSER bus 144. Turning now to FIG. 2B, the circuitry for handling the posted I/O write operation in the present invention is shown. In FIG. 2B, the write posting buffer 150 is connected between the PCI bus 106 and the ISA bus 121 for posting I/O operations from a master such as the CPU 100 on the PCI bus 106 to devices on the ISA bus 121. Also connected to the PCI bus 106 is an EOI write decoder 171. The EOI write decoder 171 receives the output of the write posting buffer 150 which indicates whether the buffer 150 is full or not. The EOI write decoder 171 is also connected to the PIC 154 for sending the interrupt control command from the processor 100 to the PIC 154. Although shown as the EOI write decoder 171, that block also preferrably decodes all I/O operations directed to the PIC 154, such as a read of the interrupt request register (IRR). This is so that all I/O operations with the PIC 154 that may be affected by the latencies present in the write posting buffer 150 and in the IRQSER bus 144 can be retried according to the invention to compensate for those latencies. The discussion that follows focuses on the write of an EOI command, but will have similar applicability to all I/O operations directed to the PIC 154.

Based on the address of the operation presented over the PCI bus 106 to write to the EOI command register of the PIC 154, and further based on the full output of the write posting buffer 150, the EOI write decoder 171 allows or blocks the write of the EOI command to the PIC 154. The PIC 154 also receives one or more IRQ inputs from one or more devices D. The device D is generally connected to the ISA bus 121, although the device D could also be a stand alone device which is directly on the motherboard and is decoded by the processor 100.

During operation, the device D needs servicing and pulses its IRQ output to the PIC 154. The PIC 154 causes the processor 100 to jump to the interrupt handling routine. At the end of the interrupt handling routine, the processor 100 issues a clear interrupt command to the device D, which could be an I/O read or an I/O write, to a register on the device D to clear the interrupt signal IRQ that is generated by the device D. Once the device D receives the clear command, the device D deasserts its IRQ output.

Next, the processor 100 issues an EOI command directed at a command register on the PIC 154 to indicate to the PIC 154 that the servicing of the interrupt has been completed. The write of the EOI command is captured and managed by the EOI write decoder 171, or alternatively is retried on the PCI bus 106, so that the issuance of the EOI command to the PIC 154 is performed in the proper sequence.

Upon receipt of the EOI command, the EOI write decoder 171 checks the write posting buffer 150 to see if the buffer 150 is empty. If so, the EOI write decoder 171 allows the EOI command to pass through to the PIC 154.

Alternatively, if the write posting buffer 150 is not empty, the EOI write decoder blocks the EOI command to the PIC 154 using the PCI retry cycle as described below. Once the write posting buffer 150 becomes empty, the EOI write decoder 171 allows the EOI command to be issued to the PIC 154 to complete the interrupt handling sequence. A small delay period of 15 PCI clock cycles is also inserted between the time the buffer 150 becomes empty and the time the EOI command is written to the PIC 154 to ensure that the buffer latency is accounted for. In this manner, the invention allows for posted I/O write operations. Further, the present invention ensures that the EOI command to the interrupt controller 154 is presented after the IRQ of the device D has been cleared.

Turning now to FIG. 2C, the interrupt handling device for handling interrupts with long latency cycles are presented. In FIG. 2C, a bridge 151 is connected between the PCI bus 106 and the ISA bus 121 for communicating operations from a master such as the CPU 100 on the PCI bus 106 to devices on the ISA bus 121. Also connected to the PCI bus 106 is an EOI write decoder 171. The output of the EOI write decoder 171 is connected to the PIC 154. The PIC 154 receives one or more IRQ inputs from one or more devices D over a long latency interrupt transmission medium such as the interrupt serial bus IRQSER 144. The circuitry for receiving the IRQSER 144 has an output indicating whether the interrupt serial bus is idle or not.

The EOI write decoder 171 allows the write of the EOI command to the PIC 154 to take place, based on the address presented over the PCI bus 106 to write to the EOI command register of the PIC 154, and further based on the active/idle status of the IRQSER bus 144. During operation, the device D needs servicing and transmits the interrupt request over the serial interrupt bus IRQSER 144. Upon receipt of the interrupt signal over the IRQSER 144, the PIC 154 causes the processor 100 to jump to the interrupt handling routine. At the end of the interrupt handling routine, the processor 100 issues the clear interrupt command to the register on the device D via the bridge 151 to clear the interrupt signal being generated by the device D. Once the device D receives the clear interrupt command, the interrupt signal to the serial interrupt bus IRQSER 144 is deasserted. Due to the latency inherently associated with the process of serial transmission, the IRQ input at the PIC 154 is deasserted a short time later.

Immediately after issuing the clear interrupt command, the processor 100 issues an EOI command to the command register on the PIC 154 to indicate to the PIC 154 that the interrupt has been handled. However, the new interrupt signal may or may not have reached the PIC 154 due to the IRQSER bus latency. Thus, upon receipt of the EOI command from the processor 100, the EOI write decoder 171 checks the status of the interrupt serial bus IRQSER 144 to see if the IRQSER bus 144 is idle. If so, the EOI write decoder 171 allows the EOI command to pass through to the PIC 154.

Alternatively, if the IRQSER bus 144 is active, the EOI write decoder blocks the EOI command to the PIC 154 using the PCI retry cycle. Once IRQSER 144 becomes idle, the EOI write decoder 171 allows the EOI command to be issued to the PIC 154 to complete the interrupt handling sequence. A small delay period of two back-to-back IRQSER cycles is also inserted between the time the IRQSER bus 144 becomes idle and the time the EOI command is written to the PIC 154 to ensure that the IRQSER latencies are properly handled. In this manner, the invention avoids the necessity of delaying the write of the EOI command by the maximum IRQSER latency and further ensures that the EOI command to the interrupt controller 154 is presented only after the interrupt request from the device D has been cleared.

Although the write posting buffer 150 of FIG. 2B is absent in FIG. 2C, the write posting buffer 150 can be used in place of the bridge 151 to achieve higher I/O throughput for the computer system S. FIG. 2D shows such a combination where the I/O write posting aspect and the IRQSER bus interrupt handling aspect operate together. In FIG. 2D, the I/O operation to clear the device D from the processor 100 is posted by the write posting buffer 150. Next, the processor 100 writes an EOI command to the PIC 154 via the EOI write decoder 171.

In the event that the posting buffer 150 is empty and the IRQSER bus 144 is idle, the decoder 171 allows the write of the EOI command to the PIC 154 to proceed. Alternatively, if the posting buffer 150 is idle, the decoder 171 waits until the write posting buffer 150 has cleared and inserts a small delay of 15 PCI clocks. Next, the decoder 171 checks and waits until the IRQSER bus 144 becomes idle. If the IRQSER bus 144 had been active, the decoder 171 inserts a delay of two back-to-back IRQSER cycles to ensure that the latency period across the IRQSER bus has been accounted for before allowing the write of the EOI command to be presented to the PIC 154. The circuit of FIG. 2D thus allows I/O posting and avoids the necessity of delaying the write of the EOI command by the maximum IRQSER latency and further ensures that the EOI command to the interrupt controller 154 is presented only after the interrupt request from the device D has been cleared.

Figure 3:
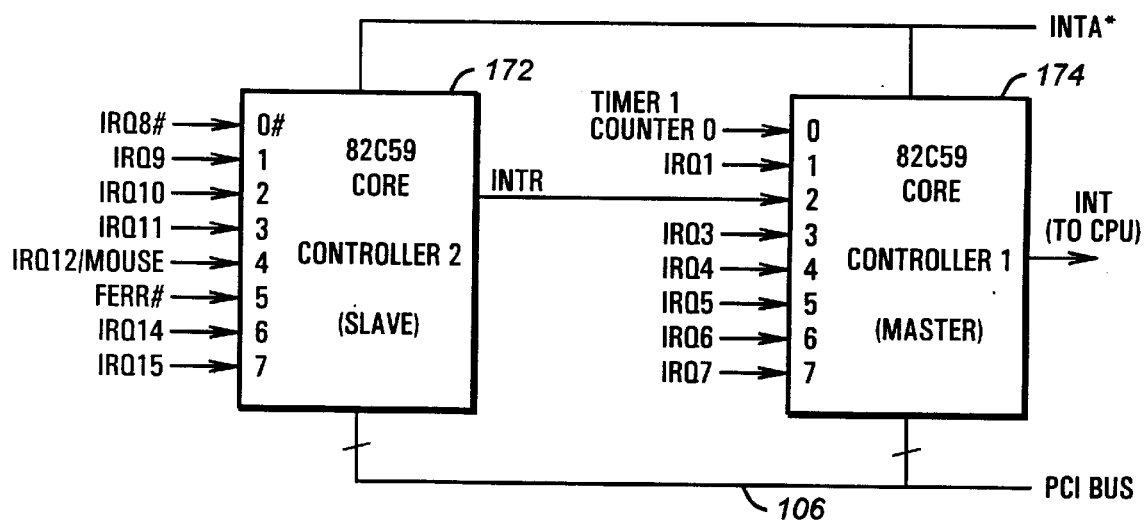
FIG. 3 is a schematic illustration of a circuit of the interrupt controller of FIG. 2.

FIG. 3 illustrates in more detail the interrupt controller 154. The interrupt controller 154 preferably includes two 8259 compatible controllers 172 and 174 from Intel Corporation. These controllers are connected in a cascaded mode to receive the sixteen interrupt signals from the IRQSER interface 170. Each 8259 interrupt controller handles up to 8 vectored priority interrupts for the microprocessor 100. The 8259 interrupt controller 174 is classified as a master interrupt controller. Each 8259 interrupt controller has an interrupt output. Traditionally, the master 8259 controller 174 receives ISA interrupt request lines IRQ[7:0] from the ISA bus 121. By connecting the interrupt output of the second 8259 controller 172 to the IRQ2 input of the master interrupt controller, the second interrupt controller becomes the slave interrupt controller. The slave receives interrupt request lines IRQ[15:8] from the ISA bus 121.

When one or more of the interrupt request lines IRQ[15:0] are asserted, the interrupt controller 154 determines the priority of the incoming interrupt lines and whether any of the IRQ[15:0] lines need to be masked. If a mask bit corresponding to an interrupt line is set, then the interrupt controller 154 ignores the assertion of the particular interrupt line If the incoming interrupt line is not masked, the master 8259 controller 174 of the interrupt controller 154 generates the INT signal to interrupt the processor 100.

Each of the interrupt controllers 172 and 174 includes an interrupt request register (IRR) and an in-service register (ISR). The IRR is used to store all of the interrupt levels which are requesting service. Thus, the IRR in the master interrupt controller 174 receives the signals IRQ[7:0] and the IRR in the slave interrupt controller 900 receives the signals IRQ[15:8]. The ISR is used to store all of the interrupt levels which are being serviced by the microprocessor. The setting of a bit in the ISR indicates that the particular interrupt request is being serviced. Each of the interrupt controllers 172 and 174 also includes a priority resolver for determining the priorities of the bits in the IRR. In addition, each of the interrupt controllers 172 and 174 also includes an interrupt mask register for storing the bits for masking the interrupt signals IRQ[15:0]. If one or more of the interrupt signals IRQ[15:0] are received as active by the interrupt controllers 172 and 174, the interrupt controllers 172 and 174 respond by determining the priority of the asserted interrupt signals and determining if the mask bit associated with any of the asserted interrupt signals is set. If a mask bit corresponding to an IRQ line is set high, that IRQ line being asserted is ignored.

As noted above, the 8259 controllers 172 and 174 respond to the assertion of a signal INTA*, which indicates that the microprocessor is executing an interrupt acknowledge cycle. When INTA* is asserted one of the 8259 controllers 172 and 174 responds by providing the interrupt vector to the PCI bus. If the interrupt controller determines that any one of IRQ[7:0] interrupt signals has been asserted, the master interrupt controller 174 provides the interrupt vector. If it is determined that the one of the IRQ[15:8] signals has the highest priority, then the slave interrupt controller 172 asserts its INT output, which is connected to the IRQ2 input of the master interrupt controller 174, to indicate to the master interrupt controller 174 that the slave interrupt controller 172 will provide the interrupt vector. The processor 100 next determines the address of the appropriate interrupt service routine from the interrupt vector. The interrupt service routine is then executed. It is noted that if a particular IRQ line is shared either between multiple PCI interrupts or between a PCI interrupt and an ISA interrupt, then the interrupt service routine would have to poll the appropriate peripheral device to determine which one actually asserted the interrupt signal.

The IRQ interrupt inputs to the 8259 compatible interrupt controllers 172 and 174 can be programmed to be either edge sensitive or level sensitive. This is accomplished by programming the bits in an Edge/Level Control Register in the interrupt controllers 172 and 174. These IRQ interrupt inputs are cleared by the 8259 controllers 172 and 174 upon receipt of an I/O write of the EOI command to the appropriate registers on the 8259 controllers 172 and 174. Since the PCI specification requires that its interrupt signals must be level sensitive, in the event that the interrupts are generated by a PCI device, the ISA IRQ lines to which the PCI interrupt signals are to be mapped must be set to level sensitive mode if sharing is to occur.

The system controller 112 also provides a write posting buffer 150 for buffering write operations to enhance performance by posting I/O writes to the ISA bus 121 from the PCI bus 106. The write posting buffer 150 is connected between the PCI bus 106 and the ISA bus 121. When a write cycle from the PCI bus 106 to the ISA bus 121 is initiated, the address present on the PCI address buffer is latched into an LA latch (not shown) on the PCI bus and the write data moves to the ISA write buffer in the buffer 150. Additionally, a second 32-bit write cycle can be posted in the PCI write data buffer as soon as the LA hold on the ISA bus 121 is met and the LA latch becomes available. The ISA write posting buffer 150 accepts all memory and I/O write cycles directed to the ISA bus 121, except writes to the interrupt controller registers located at addresses 20H, 21H, A0H, and A1H and to the registers located at 60H and 92H to change the A20 setting. As described below, if the interrupt addresses are written to, the interrupt handling logic verifies that the posting buffer 150 is empty and the interrupt serial bus IRQSER is idle before accepting the write operation.

Figure 4:
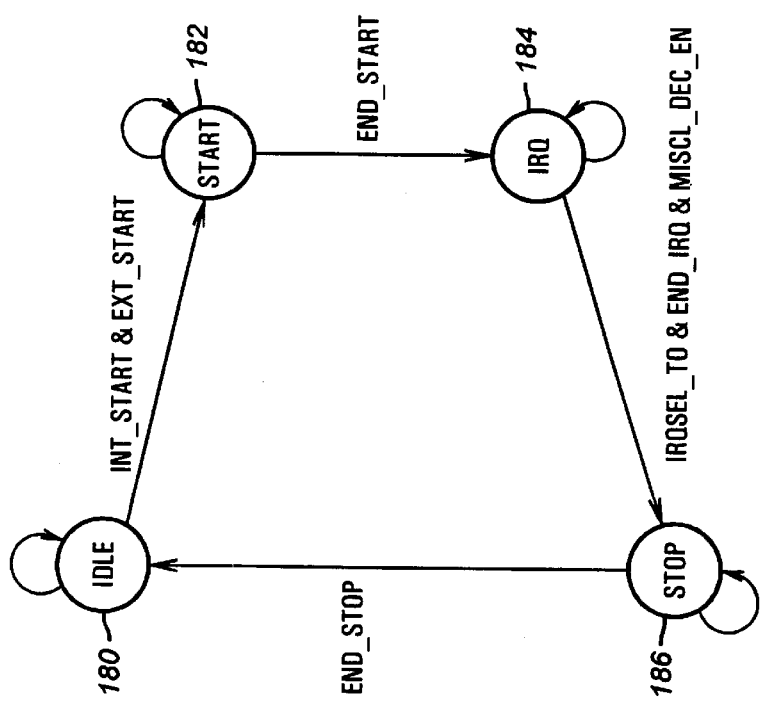
FIG. 4 is a state diagram for controlling the interrupt handling device of the present invention.

Turning now to FIG. 4, the IRQSER state machine 168 is disclosed in more detail. The state machine includes an IDLE state 180, a START state 182, an IRQ state 184, and a STOP state 186. Upon reset, the IRQSER state machine enters the IDLE state 180. Upon the assertion of INT_START or EXT_START signals, the state machine transitions to the START state 182, where it remains until the start/stop detector 166 detects the end of the start frame signal END_START. INT_START is a signal asserted by the start/stop detector 166 when it detects a start frame from an internal interrupt source. Similarly, EXT_START is a signal asserted when a start frame is detected from an external interrupt source via EXT_START. Upon detecting the end of the start frame via the signal END_START, the state machine transitions to state IRQ 184. Next, the state machine of the master system controller 112 waits for the assertion of the signal IRQSEL_TO, a signal indicating that one serial interrupt bus frame has been completed; END_IRQ, a signal indicating that this is the end of the current IRQ frame; and MISCL_DEC_EN, a signal which when true indicates this controller chip is selected to act as a host on the IRQSER bus 144. The state machine then transitions to the STOP state 186. Finally, upon detecting the end of stop frame via the assertion of END_STOP, the state machine transitions back to IDLE state 180. Specifics of the IRQSER frame format are discussed below in conjunction with FIGS. 10A–10B.

The IRQSER state machine 168 is inactive only when it is in the IDLE state 180. In any other state, interrupts may be occurring and thus the IRQSER bus is active. The output of the IRQSER state machine 168 is provided to EOI write decoder 171 which synchronizes the I/O request to the interrupt controller 154 so that I/O operations are accepted only after the interrupt signal has been completely transmitted over the interrupt serial bus. The EOI write decoder 171 is also connected to the PCI bus 106 and to the ISA write posting buffer 150.

Figure 5:
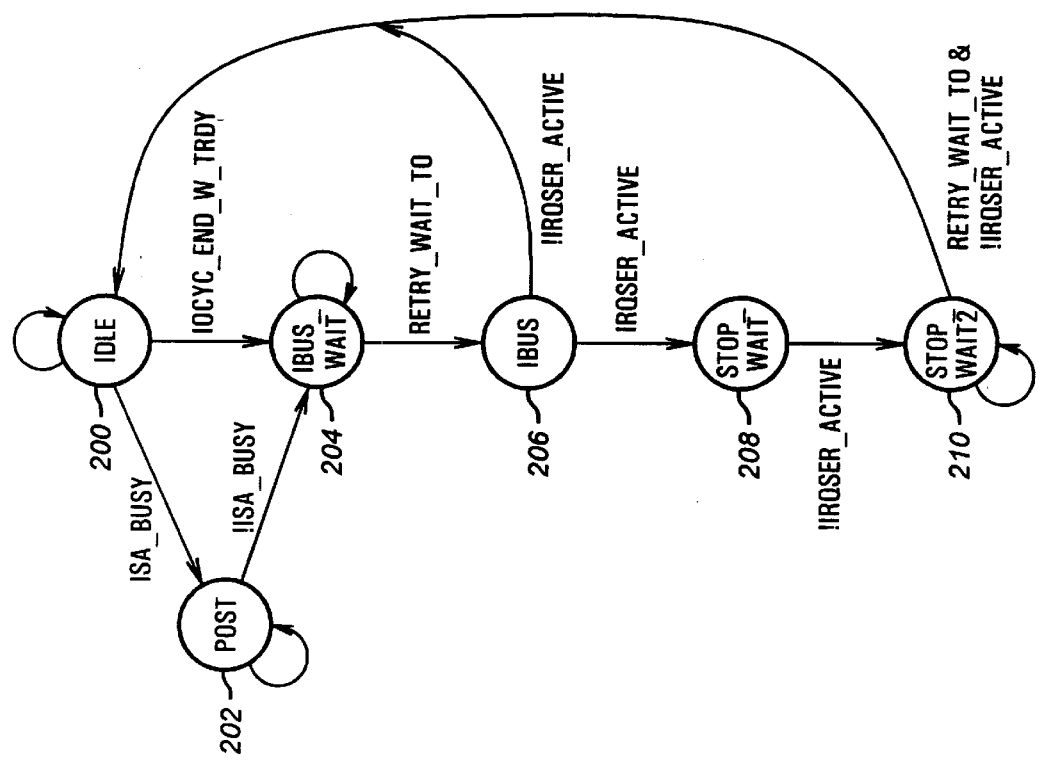
FIG. 5 is a state diagram of the retry engine for the interrupt handling device of the present invention.

Turning now to FIG. 5, the state machine in the EOI write decoder 171 for retrying I/O writes of the EOI commands to the PIC 154 is disclosed. As discussed earlier, the EOI command is written via an I/O write to a register on the PIC 154. The state machine of FIG. 5 has six states: an IDLE state 200, a POST state 202, an IBUS_WAIT state 204, an IBUS state 206, a STOP_WAIT state 208 and a STOP_WAIT2 state 210. Upon reset or power up, the state machine of the EOI write decoder 171 is in the IDLE state 200. The state machine remains in the IDLE state until either the write posting buffer 150 becomes empty and a PCI I/O cycle has completed, or until the write posting buffer 150 becomes full. Upon detecting that the ISA write posting buffer is fill as indicated by ISA_BUSY, the state machine transitions to the POST state 202, where it remains until ISA_BUSY is deasserted, which indicates that the write posting buffer 150 is empty. When ISA_BUSY is deasserted, the state machine transitions from POST state 202 to the IBUS_WAIT state 204.

Alternatively, from the IDLE state 200, the assertion of IOCYC_END_W_TRDY, a signal indicating that a PCI I/O cycle has successfully completed with the assertion of the PCI target's ready signal TRDY, causes the state machine to transition to the IBUS WAIT state 204. In the IBUS_WAIT state 204, a predetermined delay is provided for preferably 15 PCI clock periods. This delay provides the interrupting device sufficient time to either clear the interrupt signal over the interrupt serial bus IRQSER or to generate a START pulse on IRQSER bus in the event that another interrupt needs to be serviced.

From the IBUS_WAIT state 204, the state machine transitions to the IBUS state 206 upon the assertion of a timeout signal RETRY_WAIT_TO. RETRY_WAIT_TO is a signal indicating the end of the predetermined wait period since the specification allows up to sixteen clock period for an IRQSER slave to assert the start pulse.

From the IBUS state 206, upon the assertion of IRQSER_ACTIVE, the state machine transitions back to the IDLE state 200. IRQSER_ACTIVE is a signal which is asserted whenever the state machine of FIG. 4 is not in the IDLE state 180. Thus, if the wait period has expired and the interrupt serial bus IRQSER is inactive, the state machine of FIG. 5 returns to the IDLE state 200 and allows access to the PIC 154. Otherwise, the state machine transfers to the STOP_WAIT state 208 to wait for a stop pulse. Upon the deassertion of IRQSER_ACTIVE, the state machine of FIG. 5 transitions from the STOP_WAIT state 208 to the STOP_WAIT2 state 210. From state 210, if RETRY_WAIT_TO is asserted and IRQSER_ACTIVE is deasserted, the state machine transitions back to the IDLE state 200. In combination, states 208–210 handle the possibility that the current IRQSER transfer could contain the cleared interrupt and the possibility that the cleared interrupt has missed a transmission during the current cycle. Hence, two back-to-back IRQ cycles are checked before the state machine transitions to the IDLE state 200. Once in the IDLE state 200, if an I/O operation occurs directed to the registers of the 8259 controllers of the PIC 154, the 8259 I/O cycle can be accepted. Otherwise, the I/O operation is delayed by causing the processor 100 to perform a retry cycle.

Figure 6:
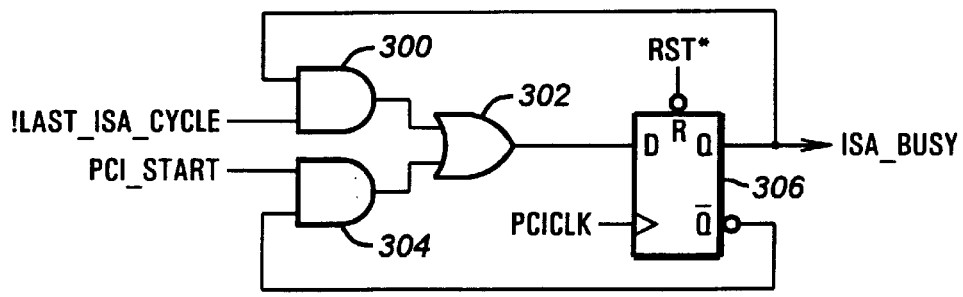
FIG. 6 is a schematic illustration of a circuit for detecting the full or empty status of the posting buffer.

Turning now to FIG. 6, the circuit for generating ISA_BUSY is disclosed. ISA_BUSY is generated by a flip-flop 306 which is clocked by the PCI clock signal PCICLK. Upon reset via the assertion of RST*, the flip-flop 306 clears ISA_BUSY. ISA_BUSY is provided to one input of an AND gate 300. The other input of the AND gate 300 is connected to !LAST_ISA_CYCLE, a signal which is low when the last ISA write operation has been completed. The output of the AND gate 300 is provided to an input of an OR gate 302 whose output is connected to the D-input of the flip-flop 306. The other input of the OR gate 302 is provided by the output of an AND gate 304. One input of the AND gate 304 is connected to !ISA BUSY, while the other input is connected to PCI_START, a signal indicating that a PCI-to-ISA cycle is about to start on the ISA side.

Upon reset, ISA_BUSY is cleared. Next, if an I/O write is posted in the write posting buffer, PCI_START is asserted which causes ISA_BUSY to be asserted. Meanwhile, LAST_ISA_CYCLE is deasserted after the ISA write from the write posting buffer 150 is occurring. On the next PCI clock, the output of the AND gate 304 becomes false as !ISA_BUSY becomes false. However, the AND gate 300 will be asserted as long as the ISA cycle has not been completed. In this manner, ISA_BUSY remains asserted until the last ISA cycle has completed. In this event, !LAST_ISA_CYCLE will be low, causing ISA_BUSY to be deasserted in the next PCI clock period. Thus, ISA_BUSY reflects whether or not the write posting buffer 150 is empty or not.

Figure 7:
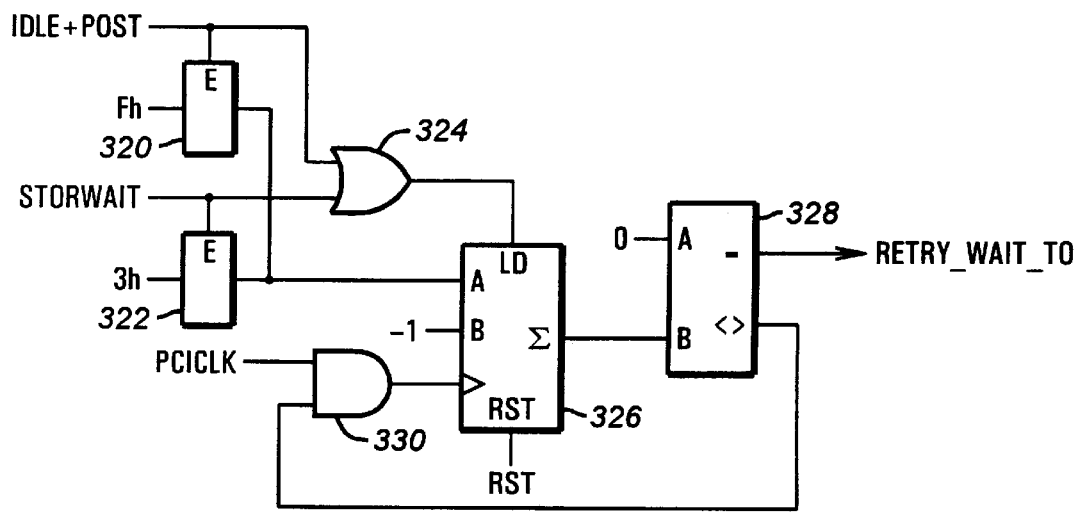
FIG. 7 is a schematic illustration of a circuit for generating predetermined delays in conjunction with the state machine of FIG. 5.

Turning now to FIG. 7, the circuit to generate RETRY_WAIT_TO is disclosed. In FIG. 7, a buffer 320 selectively presents a first predetermined value, preferably fifteen (0FH) to the A input of an adder 326. The value 0xfH is presented when the state machine of FIG. 5 is in either the IDLE state 200 or the POST state 202. Similarly, a second buffer 322 selectively presents a second predetermined value, preferably three (03H) to the A input of the adder 326. The value 3 is presented when the state machine of FIG. 5 is in the STOP_WAIT state 208. Further, an OR gate 324 enables the adder 326 to load the value presented at the A input as the output. The OR gate 324 is connected to inputs representative of the IDLE, POST and STOP_WAIT states to cause the adder 326 to save the values presented by buffers 320–322. The B input of the adder 326 is wired to a −1 value so that the adder 326 forms a count-down device from either fifteen or three. The reset input of the adder 326 is connected to the system reset signal so that on reset, the output of the adder 326 is cleared. The output of the adder 326 is connected to the B input of a comparator 328. The A input of the adder 328 is connected to 0. Thus, when the adder 326 reaches 0, the output of the comparator 328, RETRY_WAIT_TO, is asserted. The not-equal output of the comparator 328 is provided as an input to an AND gate 330, while PCICLK is connected at the other input of the AND gate 330. The output of the AND gate 330 is provided to the clock input of the adder 326 so that the count-down sequence is enabled as long as the adder 326 has not reached zero. The thus described circuit of FIG. 7 provides for a 15 PCI clock or a 3 PCI clock count-down period as required by the state machine of FIG. 5.

Figure 8:
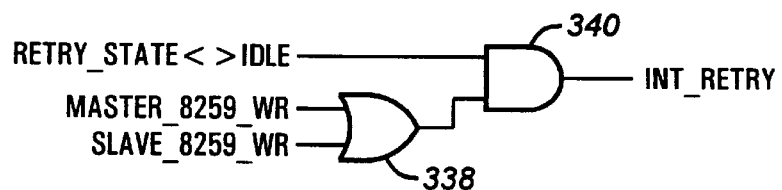
FIG. 8 is a schematic illustration of a circuit for generating the interrupt retry operation.

Turning now to FIG. 8, the circuit to generate INT_RETRY is disclosed. When this signal becomes true, the system controller 112 forces a retry of the I/O write operation on the PCI bus 106, because that operation was directed to the interrupt controllers 172 and 174 and thus could contain a write of an EOI command. An OR gate 338 receives MASTER_8259_WR and SLAVE_8259_WR, indicating respectively that the master and the slave 8259 PICs 172 and 174 are being written to. The output of the OR gate 338 is provided to one input of an AND gate 340. The other input of the AND gate 340 is connected to RETRY_STATE_<>_IDLE, a signal indicating that the state machine of FIG. 5 is not in the IDLE state. The output of the AND gate 340 is INT_RETRY, a signal indicating that the interrupt I/O operation needs to be retried on the PCI bus 106. The assertion of this signal causes the PCI bus 106 to retry the write operation in a manner well known to those skilled in the art.

When the microprocessor 100 receives an interrupt request, it finishes operation of the current instruction. Next, the microprocessor 100 saves the state of the interrupted program, which includes its address and the contents of certain registers, onto a stack to allow resumption of the interrupted program once the interrupt has been serviced. Then the microprocessor 100 executes an interrupt acknowledge cycle, which causes a signal INTA* to be generated onto the ISA system buses 121 and 135. When the 8259 interrupt controllers 172 and 174 receive the signal INTA* indicating an interrupt acknowledge cycle, one of the 8259 interrupt controllers 172 or 174 provides an interrupt vector onto the ISA data bus. The microprocessor 100 then determines the starting address of the interrupt service routine based on the interrupt vector and proceeds with the interrupt service routine. The interrupt source may be cleared automatically by devices on the source; alternatively, the interrupt service routine can clear the interrupt source by writing to a register of the interrupting source. Before the interrupt service routine returns to its caller, the routine writes an EOI command to the interrupt controllers 172 and 174 to clear the interrupt bit in the interrupt service register.

Figure 9:
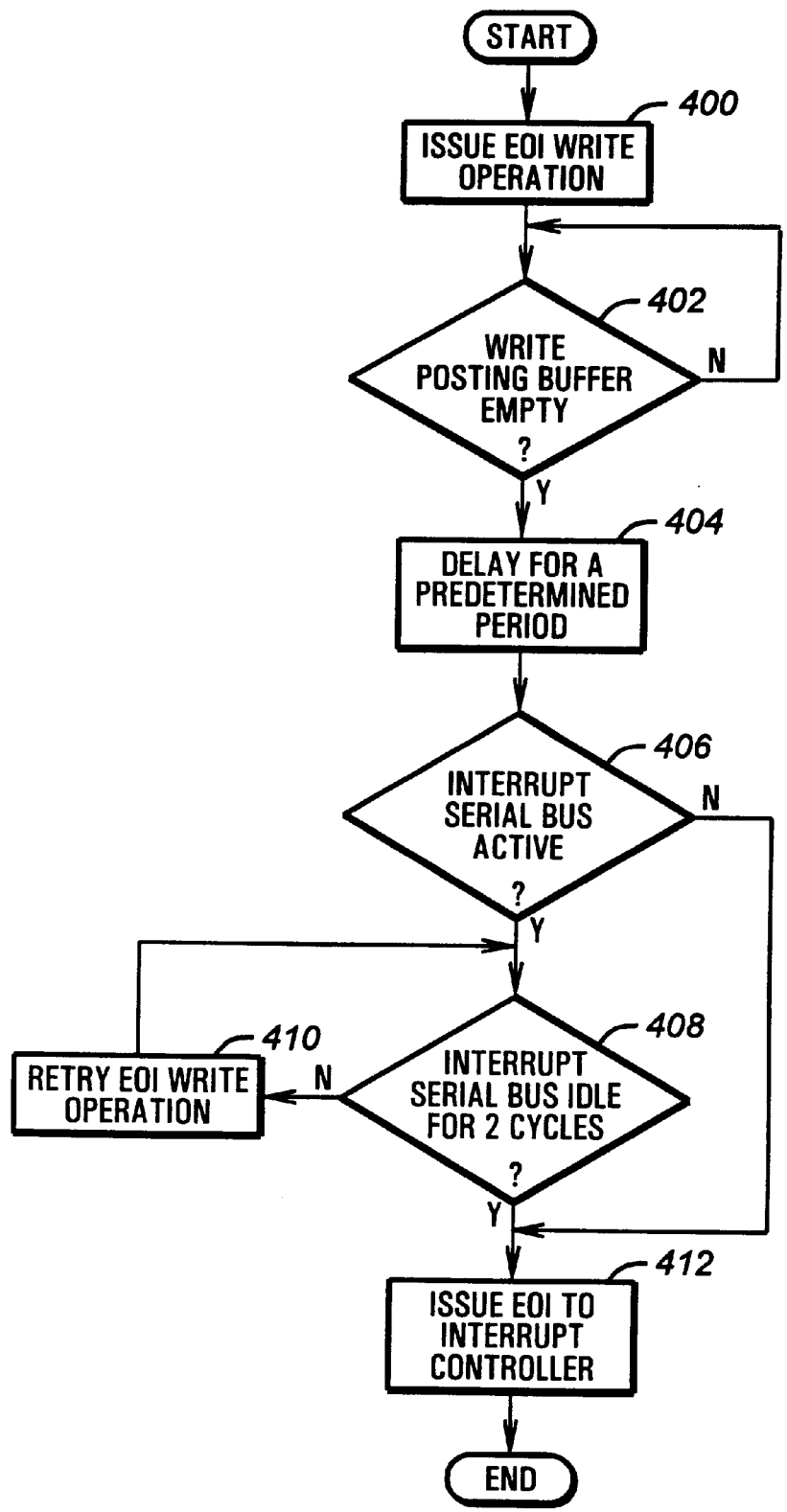
FIG. 9 is a flow diagram of the process for posting I/O write operations of the present invention.

FIG. 9 illustrates the flow process of the present invention in handling the write of the EOI command in the system controller 112 in more detail. Once the processor 100 issues the write of the EOI command in step 1400, the apparatus of the present invention checks to see if the write posting buffer 150 is empty in step 1402. If the write posting buffer 150 is not empty, the process loops back until the write posting buffer 150 is cleared. Once the write posting buffer 150 is empty, the process inserts a predetermined delay in step 1404 to ensure that the cleared interrupt signal has time to traverse the interrupt serial bus 144 and to be presented to the PIC 154 before the EOI command is written to the PIC 154.

After the delay period of step 1404, the apparatus checks to see if the interrupt serial bus 144 is idle in step 1406. If the interrupt serial bus 144 is active, the apparatus waits until the interrupt serial bus 144 has been idle for two consecutive serial bus cycles before allowing the write of the EOI command to the PIC 154 to proceed (or any other I/O operation directed to the PIC 154). Thus, if the interrupt serial bus is still active in step 1408, the apparatus retries the EOI write operation in step 1410 before looping back to step 1408. Alternatively, if the interrupt serial bus had been idle for two cycles, control transfers from step 1408 to step 1412 to issue the EOI operation to the PIC 154. Additionally, if the interrupt serial bus is inactive in step 1406, the apparatus allows the EOI instruction to be issued to the PIC 154 in step 1412 before completing the interrupt handling process in conjunction with the I/O write posting. In this manner, the system ensures that the end-of-interrupt commands to the interrupt controllers are presented when the interrupt controllers accurately reflect the state of their connected devices.

Further, it will be appreciated that other commands to the PIC 154 are handled similarly. If a read IRR command is issued, for example, the same sequence is followed as illustrated in FIG. 9. This insures that the PIC 154 accurately reflects the state of the pending interrupt requests when it receives an interrupt related command.

The following discussion provides an overview of the IRQSER bus 144 operation and gives details of an exemplary hardware implementation. The invention, however, is not limited to being practiced with this particular implementation.

The following is a discussion of the interrupt cycle of the interrupt serial bus 144. The interrupt serial bus 144 can be coupled to several slave devices; however, only one host device which controls the interrupt cycle may be coupled to the interrupt serial bus 144. In the described embodiment, the system controller 112 functions as the host device, and the system controller 130, the MSIO unit 120, PCMCIA controllers (not shown), and the MSIO unit 140 function as slave devices on the interrupt serial bus 144.

Figure 10A:
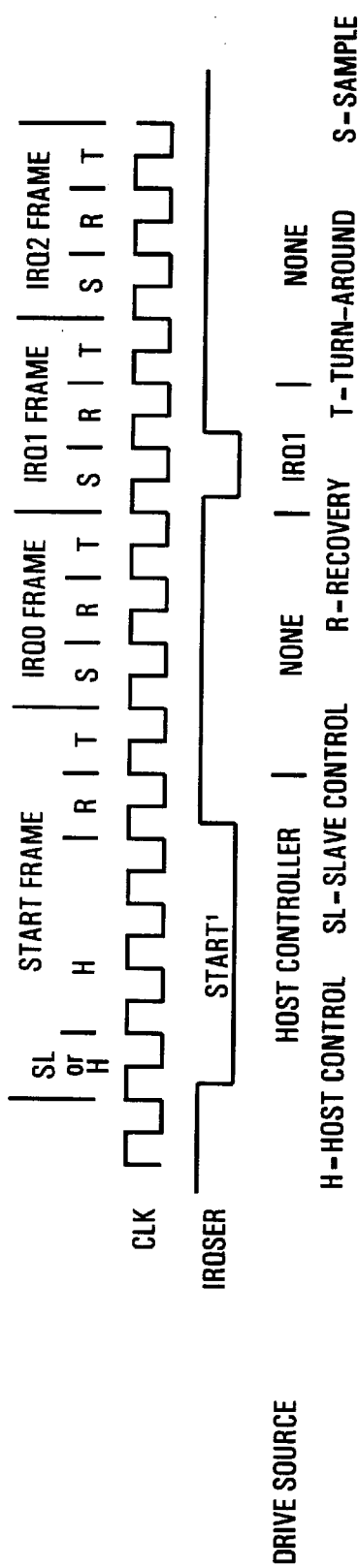
FIGS. 10A and 10B are timing diagrams illustrating operations of the interrupt serial bus of FIG. 1.
Figure 10B:
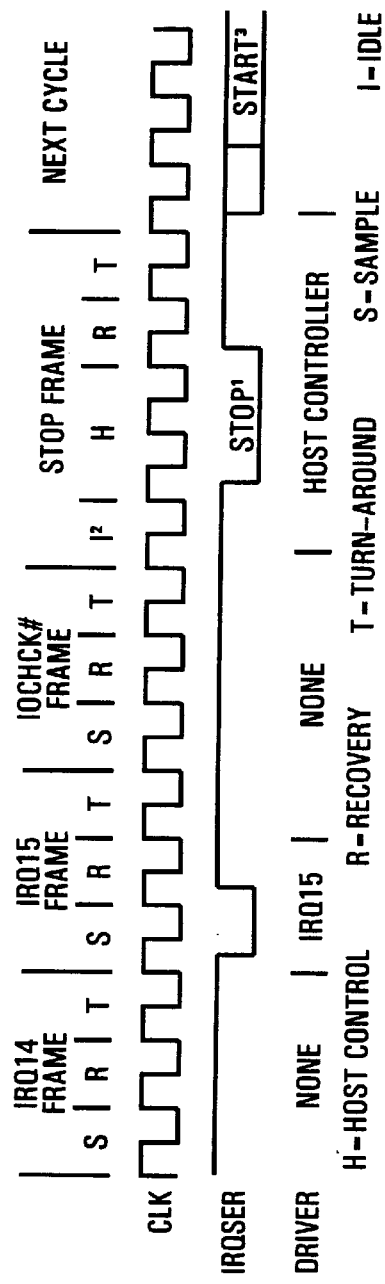

The host device, or the system controller 112, generates START and STOP frames of the interrupt cycle as shown in FIGS. 10A and 10B. Both the system controllers 112 and 130 replicate their respective IRQ signals on portions of corresponding IRQ frames. The IRQ frames occur between the START and STOP frames of the interrupt cycle. The interrupt cycle begins with the initiation of the START frame by either the system controller 112 or a slave device, such as the system controller 130, and ends with the assertion of the STOP frame by the system controller 112. For reasons of clarity, the system controller 130 will be referred to as the slave device and the system controller 112 will be referred to as the host device.

The interrupt serial bus 144 has two modes of operation: a quiet mode and a continuous mode. In the quiet mode, either the host device or the slave device may initiate a START frame when a new interrupt request is received or when an active interrupt request is deactivated.

In the continuous mode of operation, only the host device 144 may initiate a START frame on the interrupt serial bus 144. Thus, even if the slave device receives a new interrupt request, the slave device cannot initiate a START frame. The continuous mode is used to idle the interrupt serial bus 144. Once the interrupt serial bus 144 is idle, only the host device can initiate a START frame on the interrupt serial bus 144.

The length of the STOP frame driven by the host device indicates the mode of the interrupt serial bus 144 for the next interrupt cycle. The interrupt serial bus 144 is clocked by a PCI clock signal, CLK. A STOP frame of two cycles of the CLK signal indicates that the interrupt serial bus 144 is in the quiet mode for the next interrupt cycle, and a STOP frame of three cycles of the CLK signal indicates that the interrupt serial bus 144 is in the continuous mode for the next interrupt cycle.

As shown in FIGS. 10A and 10B, the interrupt cycle includes a START frame, sixteen IRQ frames (IRQ0–IRQ15), an $\overline{\text{IOCHCK}}$ frame and a STOP frame. The $\overline{\text{IOCHCK}}$ frame, corresponding to a serious error interrupt request generated by an ISA bus device, is treated as a sixteenth IRQ frame. These IRQ frames are associated with the standard set of ISA\EISA IRQ signals.

The IRQ frames include three phases occurring in the following order: a sample phase, recovery phase and a turn-around phase. Each phase has the duration of one cycle of the CLK signal. The interrupt serial bus 144 is normally "high" when deasserted. The interrupt serial bus 144 is "low" when asserted. A device that asserts the interrupt serial bus 144 during the sample phase must deassert the interrupt serial bus 144 during the recovery phase. During the turnaround phase, the serial bus 144 is tristated.

The voltage level of the interrupt serial bus 144 is "high" when tristated or deasserted. If either the host or slave device has an IRQ signal that is "low" or "asserted" and that IRQ signal corresponds to the current IRQ frame, then that serial bus device asserts the interrupt serial bus 144 during the sample phase of that IRQ frame. For example, if the IRQ1 signal provided by the slave device is asserted, then during the sample cycle of the IRQ1 frame, the slave device asserts the serial bus 144. During the recovery phase of the IRQ1 frame, the slave device, in this example, deasserts the interrupt serial bus 144. The interrupt serial bus 144 remains tristated during the turn-around phase of all IRQ frames.

In summary, if the mode of the interrupt serial bus 144 permits, either the host or slave device may initiate a START frame on the serial interrupt bus 144 which begins the interrupt cycle. The host device drives the START and STOP frames on the serial interrupt bus 144. After the START frame, IRQ frames, numbered IRQ0–IRQ15, occur next in sequential order, beginning with the IRQ0 frame.

If either the host or slave device has an asserted IRQ signal that corresponds to an IRQ frame of the interrupt cycle, the device asserts the interrupt serial bus 144 during the sample phase of the IRQ frame and deasserts the interrupt serial bus 144 during the recovery phase of the IRQ frame.

Figure 11:
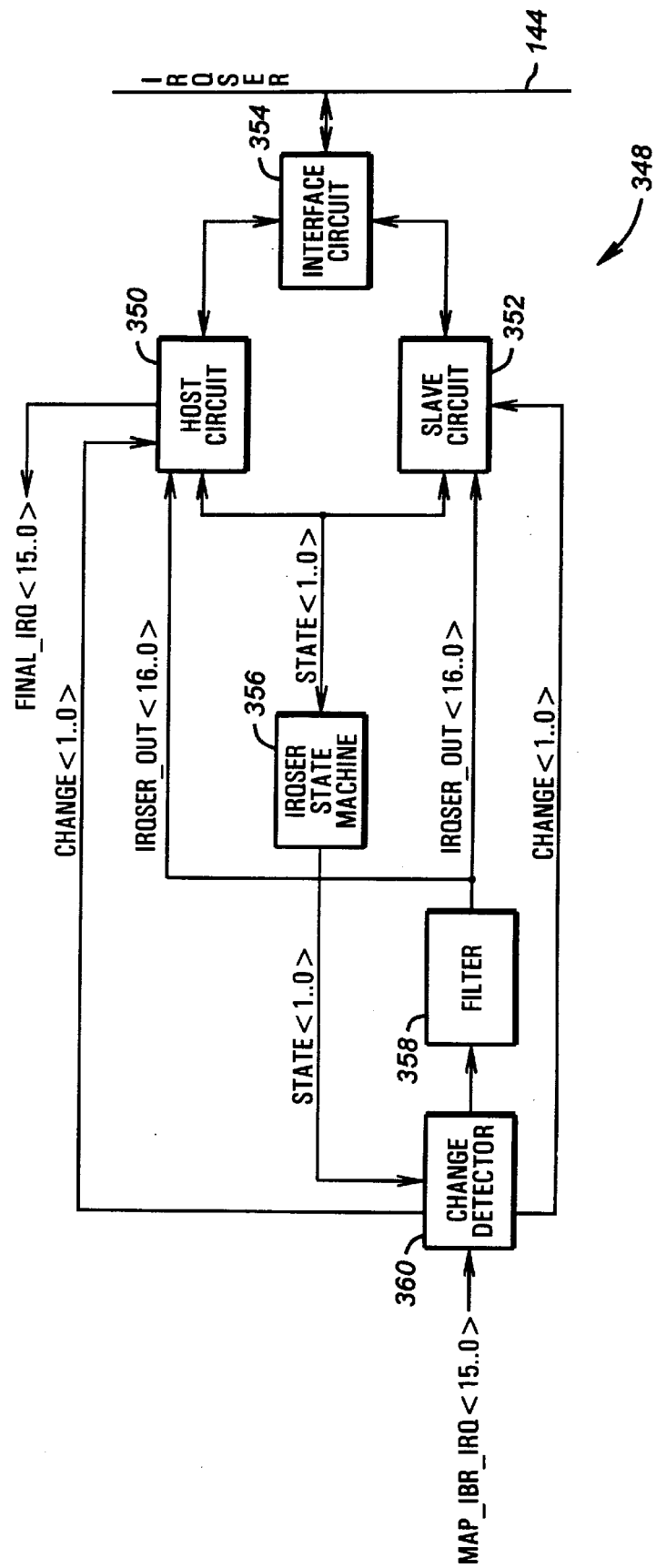
FIG. 11 is a block diagram illustrating operation of the serial bus device of FIG. 2A.

FIG. 11 is a block diagram illustrating a typical serial bus device 348. The serial bus device 348 includes a host circuit 350 and a slave circuit 352. Both the host circuit 350 and the slave circuit 352 are coupled to the interrupt serial bus 144 through an interface circuit 354. In a host device, the interface circuit 354 disables the output of the slave circuit 352 and enables the output of the host circuit 350. In a slave device, the interface circuit 354 disables the output of the host circuit 350 and enables the output of the slave circuit 352.

A change detection circuit 360 detects whether there are any changes in the IRQ signals represented by MAP_IBR_IRQ<15..0> within the last cycle of the PCI clock signal CLK. If a change is detected, then one or both of the two bits of a two bit CHANGE<1..0> signal provided by the change detection circuit 360 are asserted.

The CHANGE<1..0> signal is provided to the host circuit 350 and the slave circuit 352. When a bit in the CHANGE<1..0> signal is set, this indicates to both the host circuit 350 and the slave circuit 352 that an interrupt cycle needs to be initiated on the interrupt serial bus 144 in order to update the IRQ signals provided to an interrupt controller such as the PIC 154.

The host circuit 350 initiates a START frame, thereby beginning an interrupt cycle, by asserting the interrupt serial bus 144 for one clock cycle of the PCI clock signal CLK. The slave circuit 352 can also initiate a START frame to update the IRQ signals by asserting the interrupt serial bus 144 if the serial interrupt bus 144 is in the quiet mode.

The IRQ signals represented by MAP_IBR_IRQ<15..0> pass through a filter circuit 358. The filter circuit 358 filters out low pulses on any IRQ signal of 2 PCI clocks or less, and filters out high pulses on any IRQ signal of 8 PCI clocks or less. The filtering of the low pulses meets the 100 nanosecond requirement set by the PIC 154. The filtering of the high pulses minimizes the occurrence of spurious interrupts in the computer system. The IRQ signals provided by the filter circuit 358 are represented by IRQSER_OUT<16..0>. These IRQ signals are provided to the slave circuit 352 and the host circuit 350.

An IRQSER state machine 356 receives from the host circuit 350 and the slave circuit 352 the current status of the interrupt serial bus 144 and provides a two bit signal, represented by STATE<1..0>, indicative of the state of the interrupt serial bus 144, advanced by one cycle of the CLK signal. Both the host circuit 350 and the slave circuit 352 receive the STATE<1..0> signal in order to keep track of the frames and phases in the current interrupt cycle of the interrupt serial bus 144.

It will be appreciated that the details illustrated in FIGS. 11–20 elaborate on the details of FIG. 2A, showing the further operation of the change detector 162, the filter/extender 164, the start/stop detector 166, the IRQSER state machine 168, and the IRQSER interface 170. While the pervious discussion focused on the details most directly related to the invention, the following discussion illustrates more generally how to implement an interrupt serial bus device.

In summary, in a host device, the host circuit 350 transmits the IRQ signals received by the serial bus device 348 to the interrupt serial bus 144 during an interrupt cycle. The interface circuit 354 disables the output of the slave circuit 352. The host circuit 350 further drives the START and STOP frames of the interrupt cycle. Additionally, the host circuit 350 receives the IRQ signals present on the interrupt serial bus 144 during the interrupt cycle and furnishes the final IRQ signals, represented by FINAL_IRQ<15..0>, to the PIC 154, for example.

In a slave device, the interface circuit 354 disables the output of the host circuit 350. The slave circuit 352 transmits the interrupt request signals received by the serial bus device 348 to the interrupt serial bus 144 during appropriate IRQ frames of the interrupt cycle.

The serial bus device 348 further includes the change detection circuit 360 for detecting a change in the IRQ signals represented by MAP_IBR_IRQ<15..0>, the filter circuit 358 for filtering out low and high interrupt requests, and the state machine 356 for controlling the interrupt cycle.

Figure 12:
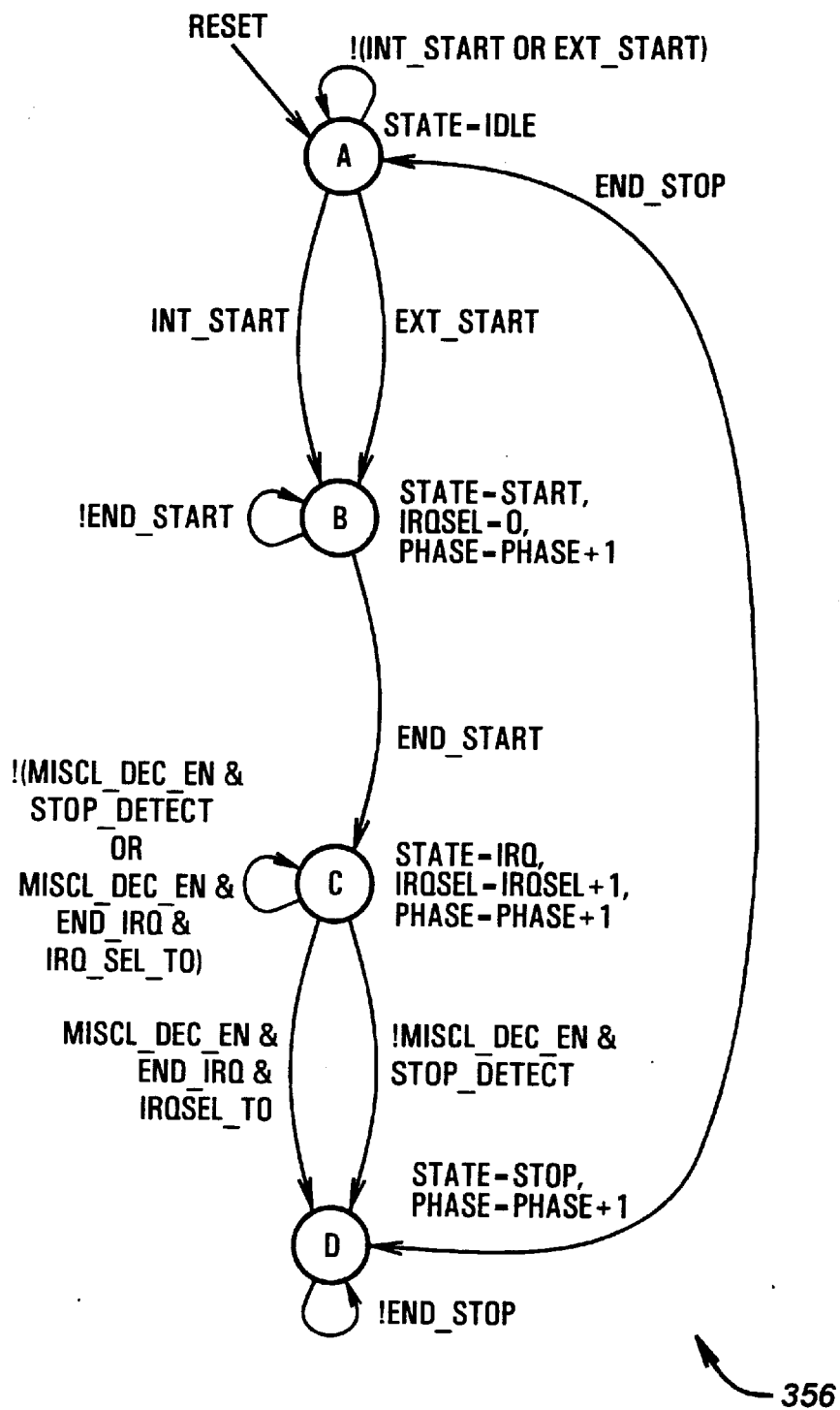
FIG. 12 is a state diagram illustrating operation of the interrupt serial bus state machine of FIG. 11.

Shown in FIG. 12 is a state diagram illustrating operation of the IRQSER state machine 356. In state A, the IRQSER state machine 356 is in an IDLE state and the STATE<1..0> signal is equal to IDLE<1..0>. IDLE<1..0> is a 2 bit parameter indicative of the IDLE state.

The IRQSER state machine 356 receives signals from the host circuit 350 and the slave circuit 352 regarding the state of the interrupt serial bus 144. The state of the interrupt serial bus 144 is one cycle of the CLK signal behind the state indicated by the state machine 356. An internal start initiation signal, INT_START, is a signal provided by the slave circuit 352 and the host circuit 350 to the IRQSER state machine 356 to indicate that at least one of the IRQ signals represented by MAP_IBR_IRQ<15..0> has changed. This informs the IRQSER state machine 356 that a START frame is going to be asserted on the next positive edge of the CLK signal.

An external start initiation signal, EXT_START, is a signal provided by the slave circuit 352 and the host circuit 350 to the IRQSER state machine 356 to indicate whether another serial bus device has initiated a START frame on the interrupt serial bus 144. The IRQSER state machine 356 monitors the remainder of the interrupt cycle by counting the cycles of the CLK signal.

When either the INT_START or the EXT_START signal is asserted, the host circuit 350 in a host device asserts a START frame on the next positive edge of the CLK signal, thereby beginning the interrupt cycle. If either the INT_START signal or the EXT_START signal is asserted, then control passes from state A to state B where the interrupt cycle is currently in the START frame. The IRQSER state machine 356 stays in state B as long as the end of the START frame, indicated by the assertion of a signal END_START by the IRQSER state machine 356, is not detected. The signal END_START is asserted when the IRQSER state machine 356 detects the end of the START frame and negated when the START frame begins.

In state B, the IRQSER state machine 356 sets the STATE<1..0> signal equal to a two bit parameter, START<1..0>, which indicates to the host circuit 350 and the slave circuit 352 that a START frame is underway on the interrupt serial bus 144. Furthermore, in state B, the IRQSER state machine 356 sets a 5 bit signal indicative of the current IRQ frame, IRQSEL<4..0>, equal to zero. The IRQSEL<4..0> signal is advanced one cycle of the CLK signal ahead of the current IRQ frame on the interrupt serial bus 144.

Also in state B, the IRQSER state machine 356 increments a 4 bit PHASE<3..0> signal which is indicative of the phase of the current START, STOP or IRQ frame advanced by one cycle of the CLK signal. The PHASE<3..0> signal is incremented for each cycle of the CLK signal during the interrupt cycle and is set equal to "0" at the beginning of every frame. The IRQSER state machine 356 asserts the signal END_START to indicate the end of the START frame. When this occurs, control transfers from state B to state C.

In state C, the IRQSER state machine 356 sets the STATE<l..0> signal equal to a 2 bit parameter IRQ<1..0>. IRQ<1..0> indicates the interrupt cycle is currently in one of the IRQ frames. The IRQSEL<4..0> signal is provided by the IRQSER state machine 356 to both the host circuit 350 and the slave circuit 352 to indicate the current IRQ frame.

Furthermore, during state C, the IRQSER state machine 356 provides the PHASE<3..0> signal to the host circuit 350 and the slave circuit 352 to indicate the phase of the current IRQ frame. During the first CLK cycle of an IRQ frame, the PHASE<3..0> signal is set equal to zero which indicates the sample phase. The PHASE<3..0> signal is incremented by one for every clock cycle of CLK. For the IRQSER state machine 356, if a STOP_DETECT signal is asserted by the IRQSER state machine 356 which indicates the detection of the STOP frame, then the IRQSER state machine 356 transfers to state D.

For the IRQSER state machine 356 in a host device, if the end of the current IRQ frame is detected as indicated by the assertion of a END_IRQ signal, and a IRQSEL_TO signal is asserted which indicates the last IRQ frame, then control transfers from state C to state D. IRQSEL_TO is a signal indicative of when all the IRQ frames have been presented in the interrupt cycle. The IRQSEL_TO signal is asserted when this condition is TRUE and negated when this condition is FALSE. The END_IRQ signal indicates the end of a IRQ frame. The END_IRQ signal is asserted at the end of each IRQ frame and negated at the beginning of each IRQ frame.

In state D, the IRQ state machine 356 sets STATE<1..0> equal to a 2 bit parameter, STOP<1..0>, to indicate the end of the STOP frame on the interrupt serial bus 144. The IRQSER state machine 356 also increments the PHASE<3..0> signal every cycle of the CLK signal to indicate the cycles of the CLK signal for the STOP frame. If the IRQSER state machine 356 asserts the END_STOP signal, which indicates the end of the STOP frame, then control transfers from state D back to state A.

In summary, the IRQSER state machine 356 governs operations of the host and slave circuits 350 and 352 through its STATE<1..0> signal. There are four states for the state machine 350: IDLE, START, IRQ and STOP. The START, IRQ and STOP states correspond to frames of the interrupt cycle.

Figure 13:
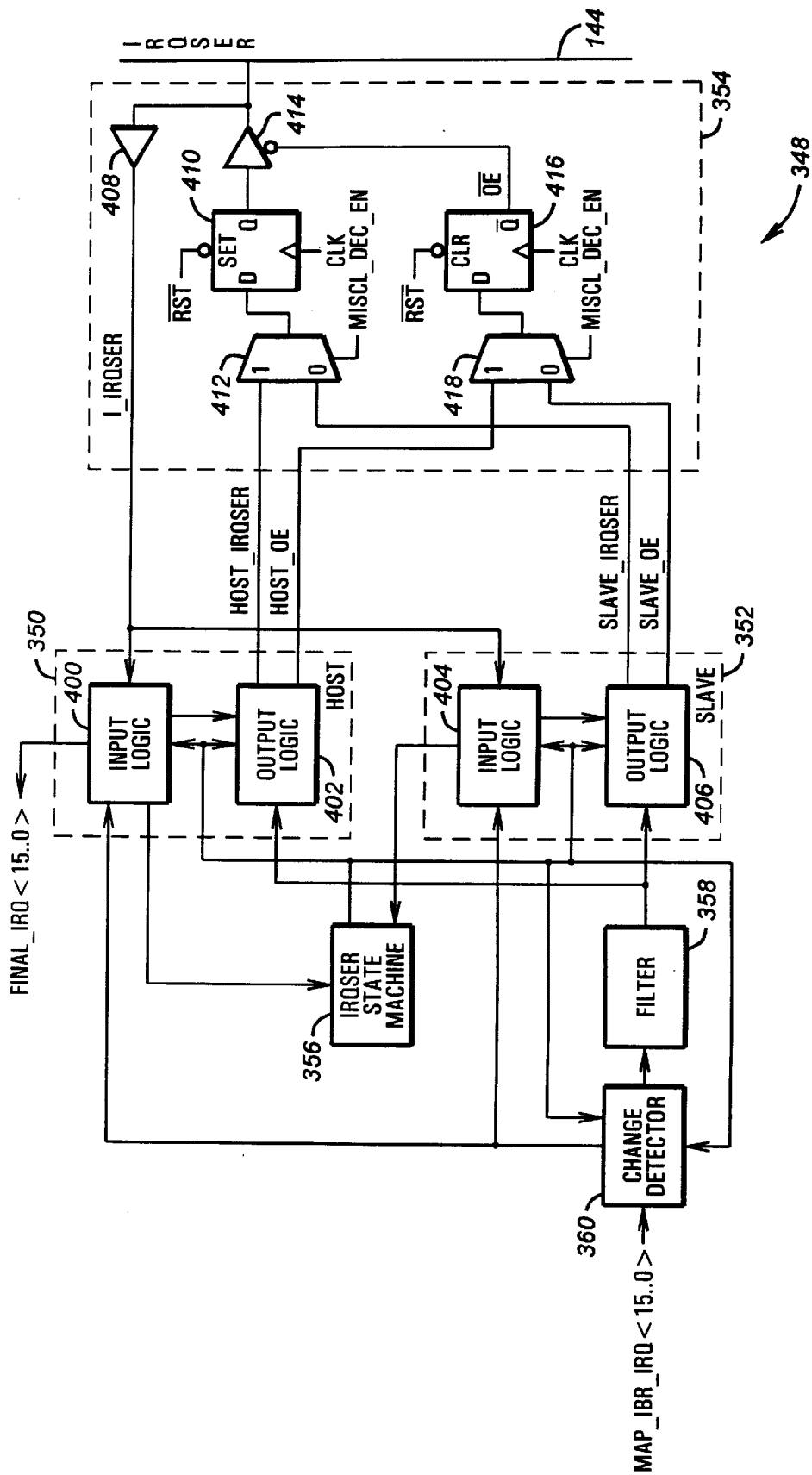
FIG. 13 is a more detailed block diagram of the slave, host and interface circuits of FIG. 1.

Now referring to FIG. 13, the interface circuit 354 of the serial device 348 provides an input signal from the interrupt serial bus 144, I_IRQSER, to input logic 404 of the slave circuit 350 and input logic 400 of the host circuit 352. The output of a buffer 408 which has its input connected to the interrupt serial bus 144, provides the I_IRQSER signal at its output.

The interface circuit 354 also enables the outputs of the host circuit 350 and the slave circuit 352 to provide output signals to the interrupt serial bus 144. A tristate buffer 414 has its output connected to the interrupt serial bus 144. The inverting output of a D-type flip-flop 416 is connected to the enable input of a tristate buffer 414 and the signal present at the inverting output is represented by an $\overline{OE}$ signal, which is asserted at appropriate times. The flip-flop 416 is clocked by the positive edge of the PCI clock signal CLK and is connected to the output of a multiplexor 418 whose select signal is connected to the MISCL_DEC_EN signal. The one input of the multiplexor 418 receives a host output enable signal, HOST_OE, provided by an output logic circuit 402 of the host circuit 350.

The zero input of the multiplexor 418 receives a slave output enable signal, SLAVE_OE which is provided by an output logic circuit 406 of the slave circuit 352. Thus, when the MISCL_DEC_EN signal is negated as in the interrupt control circuit 348 in a slave device, the SLAVE_OE signal is provided to the enable input of the tristate buffer 414. Conversely, when the MISCL_DEC_EN signal is asserted as in the interrupt control circuit 348 in a host device, the HOST_OE signal is provided to the enable input of the tristate buffer 414.

The signal input of the tristate buffer 414 is connected to the non-inverting output of a D-type flip-flop 410 which is clocked by the positive edge of the CLK signal. The input of the flip-flop 410 is connected to the output of a multiplexor 412 which has its select input receiving the MISCL_DEC_EN signal. The one input of the multiplexor 412 receives an output signal, HOST_IRQSER, from the output logic 402 of the host circuit 350. The zero input of the multiplexor 412 receives an output signal provided by the output logic circuit 406 of the slave circuit 352, SLAVE_IRQSER.

Thus, when the MSCL_DEC_EN signal is negated as in the interrupt control circuit 348 in a slave device, the SLAVE_IRQSER signal is provided to the interrupt serial bus 144 if the tristate buffer 414 is enabled. Conversely, when the MISCL_DEC_EN signal is asserted as in the interrupt control circuit 348 in a host device, the HOST_IRQSER signal is provided to the interrupt serial bus 144 if the tristate buffer 414 is enabled.

In summary, in the interrupt control circuit 348 in a host device, the interface circuit 354 provides the IRQSER signal to the interrupt serial bus 144 if the HOST_OE signal enables the tristate buffer 414. In the interrupt control circuit 348 in a slave device, the interface circuit 354 provides the IRQSER signal to the interrupt serial bus 144 if the SLAVE_OE signal enables the tristate buffer 414. The interface circuit 354 provides the input signal I_IRQSER to both the host circuit 350 and the slave circuit 352.

Figure 14:
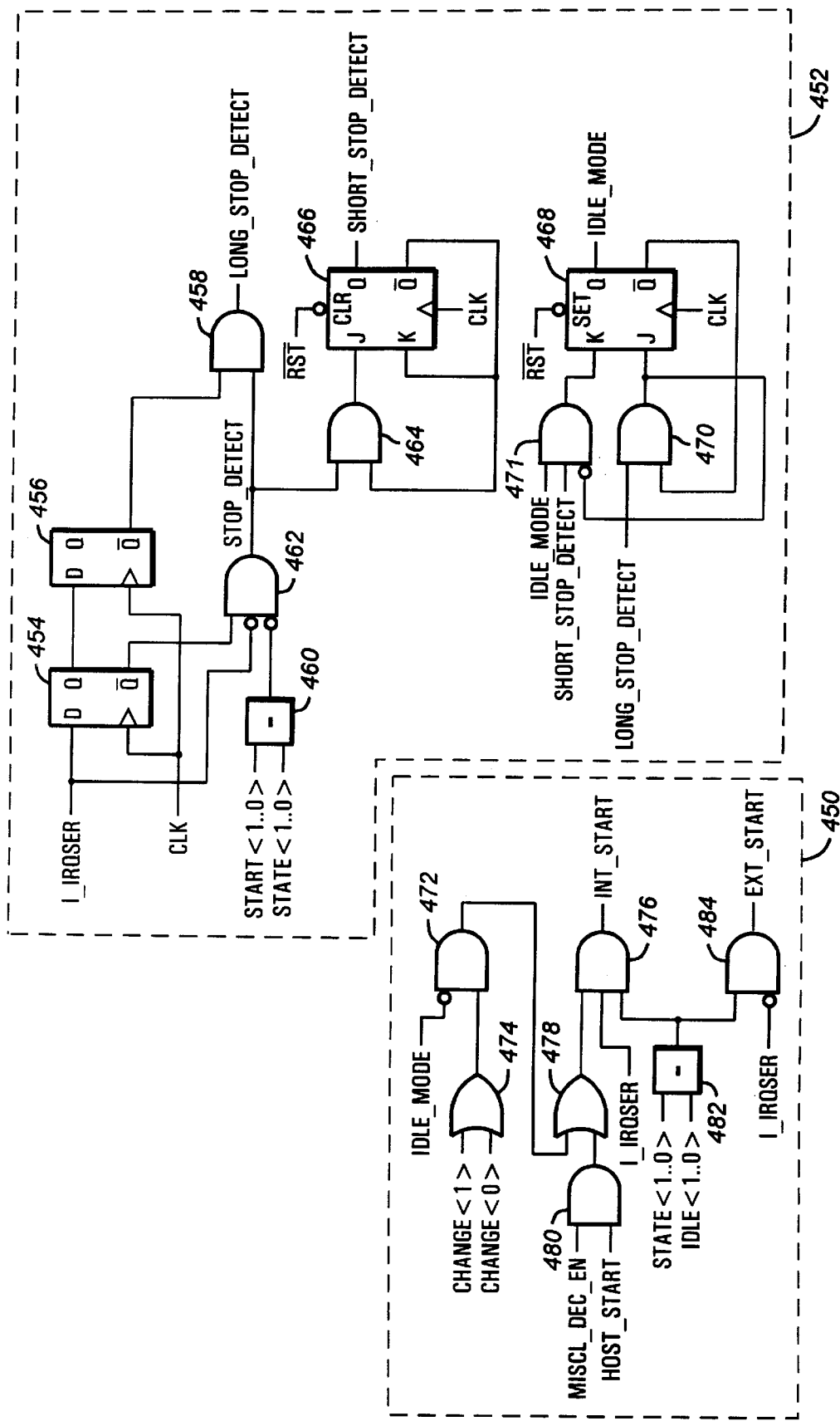
FIG. 14 is a block diagram illustrating the input logic of the slave circuit of FIG. 13.

Shown in FIG. 14 is the input logic 404 for the slave circuit 352. As described above, only the output of the slave circuit 352 in a slave device is enabled. The input logic 404 includes circuitry 450 to generate the INT_START signal and the EXT_START signal, two previously described signals used to indicate the beginning of another interrupt cycle on the interrupt serial bus 144.

The INT_START signal, when asserted, indicates that an IRQ signal represented by MAP_IBR_IRQ<15..0> has changed and the serial bus device 348 is initiating a START frame on the interrupt serial bus 144. The EXT_START signal, when asserted, indicates that another device on the interrupt serial bus 144 has initiated a START frame. The circuitry 450 is shared in common with the input logic 400 of the host circuit 350 and the input logic 404 of the slave circuit 352.

Now referring to the generation of the EXT_START signal, an AND gate 484 provides the EXT_START signal. The AND gate 484 receives at one of its inputs the inverted I_IRQSER signal which is the input signal from the interrupt serial bus 144. Thus, when the I_IRQSER signal is deasserted, its normal high position, the EXT_START signal is negated. The other input of the AND gate 484 receives the output of an equal circuit 482 which receives as its inputs the STATE<1..0> signal and the parameter IDLE<1..0>.

When the interrupt signal bus 144 is in the IDLE state, indicated by the STATE<1..0> signal equaling IDLE<1..0>, the output of the equal circuit 482 is asserted. When the STATE<1..0> does not equal IDLE<1..0>, then the output of the equal circuit 482 is negated. The other equal circuits described below are of similar design to the equal circuit 482. If the interrupt serial bus 144 is not in its IDLE state, the EXT_START signal is not asserted as the IDLE state must precede a START frame.

Now referring to the generation of the INT_START signal, the INT_START signal is provided by the output of an AND gate 476. The AND gate 476 receives at one input the I_IRQSER signal. Thus, neither the slave circuit 352 nor the host circuit 350 initiates a START frame if the I_IRQSER signal is deasserted. Furthermore, the AND gate 476 receives at another input the output of the equal circuit 482 which reflects that the interrupt serial bus 144 must be in its IDLE state for the assertion of the INT_START signal.

The third input of the AND gate 476 is connected to the output of an OR gate 478. The first input of the OR gate 478 is from circuitry, described below, that asserts this input if a change in the IRQ signals represented by MAP_IBR_

IRQ<15..0> has occurred. The first input of the OR gate 478 is connected to the output of an AND gate 472 which receives at its input an inverted IDLE_MODE signal. The IDLE_MODE signal is indicative of whether the interrupt serial bus 144 is in the continuous or the quiet mode. When IDLE_MODE is asserted, the interrupt serial bus 144 is in the continuous mode, and when IDLE_MODE is negated, the interrupt serial bus 144 is in the quiet mode.

It is to be noted that if the interrupt serial bus 144 is in the continuous mode, the output of the AND gate 472 is negated. The other input of the AND gate 472 is connected to the output of an OR gate 474 which ORs the two bits of the CHANGE<1..0> signal. When an IRQ signal represented by MAP_IBR_IRQ<15..0> has changed, as indicated by the assertion of at least one bit in the CHANGE<1..0> signal, and the interrupt serial bus 144 is in the quiet mode, then the output of the AND gate 472 is asserted.

The output of the AND gate 472 indicates whether a START frame can be initiated based on a change in the IRQ signals represented by MAP_IBR_IRQ<15..0>. If the interrupt serial bus 144 is in the continuous mode, then a START frame cannot be initiated based on this condition. Thus, the INT_START signal is asserted if the interrupt serial bus 144 is in the quiet mode, the serial bus 144 is in the IDLE state, a change in the IRQ signals represented by MAP_IBR_IRQ<15..0> is detected and the interrupt serial bus 144 is deasserted.

The second input of the OR gate 478 is connected to the output of an AND gate 480 which receives as its inputs the MISCL_DEC_EN signal and a HOST_START signal. This circuitry is actually used by the input logic 400 of the host circuit 350 to pulse the INT_START signal; however, this circuitry is discussed here to complete the discussion of the circuitry 450. The HOST_START signal, further described below, is asserted when the host circuit 350 in a host device is first enabled. Thus, the INT_START signal is asserted when the host circuit 350 is first enabled in order that the IRQ signals represented by MAP_IBR_IRQ<15..0> a are transmitted to the interrupt serial bus 144 for system visibility.

Also shown in FIG. 14 is circuitry 452 of the input logic 404 of the slave circuit 352 to detect the mode of the interrupt serial bus 144. If a LONG_STOP_DETECT signal is asserted, this indicates that a STOP frame of three cycles of the CLK signal has been detected, and the interrupt serial bus 144 is in the continuous mode of operation for the next interrupt cycle. If a SHORT_STOP_DETECT signal is asserted, this indicates that a STOP frame of two cycles of the CLK signal has been detected, and the interrupt serial bus 144 is in the quiet mode for the next interrupt cycle. The LONG_STOP_DETECT and SHORT_STOP_DETECT signals are otherwise negated.

As shown in FIG. 14, a D-type flip-flop 454, clocked by the positive edge of the CLK signal, receives the I_IRQSER signal. The non-inverting output of the flip-flop 454 is connected to the input of a D-type flip-flop 456 which is clocked by the positive edge of the CLK signal. An AND gate 462 receives the inverted I_IRQSER signal and inverting output signal of the flip-flop 454.

An equal circuit 460 has as its inputs the START<1..0> parameter and the STATE<1..0> signal. The inverted output of the equal circuit 460 is connected to the third input of the AND gate 462. As the previously described equal circuits, the output of the equal circuit 460 is asserted when its two input signals are equal. Thus, if the I_IRQSER signal is negated for two cycles of the CLK signal and the interrupt serial bus 144 is not in a START frame, the AND gate 462 asserts a STOP_DETECT signal at its output. The assertion of the STOP_DETECT signal indicates that the I_IRQSER signal has been asserted for two cycles of the CLK signal when a START frame is not present on the interrupt serial bus 144.

The output of the AND gate 462 is provided to the input of an AND gate 458 which provides the LONG_STOP_DETECT signal. The other input of the AND gate 458 is connected to the inverting output of the D-type flip-flop 456. Thus, when the I_IRQSER signal is asserted for three clock cycles of the CLK signal, the LONG_STOP_DETECT signal is asserted.

Now referring to the circuitry to generate the SHORT_STOP_DETECT signal, the STOP_DETECT signal is received by one input of an AND gate 464 whose output is connected to the J input of a JK flip-flip 466. The other input of the AND gate 464 and the K input of the flip-flop 466 are connected to the inverting output of the flip-flop 466. The non-inverting output of the flip-flop 466 provides the SHORT_STOP_DETECT signal, and the flip-flop 466 is clocked by the positive edge of the CLK signal. Thus, if the STOP frame is driven low for two cycles of the CLK signal and deasserted for the third cycle of the CLK signal, the SHORT_STOP_DETECT signal is asserted.

Now referring to the circuitry to generate the IDLE_MODE signal, a JK flip-flop 468, clocked by the positive edge of the CLK signal, provides the IDLE_MODE signal at its non-inverting output. The J input of the flip-flop 468 is connected to the output of an AND gate 470. One input of the AND gate 470 receives the LONG_STOP_DETECT signal, and the other input of the AND gate 470 is connected to the inverting output of the flip-flop 468. Thus, if the IDLE_MODE signal is negated, which indicates that the interrupt serial bus 144 is in the quiet mode, then the J input of the flip-flop 468 is asserted. When this occurs, the flip-flop 468 asserts the IDLE_MODE signal on the next positive edge of the CLK signal.

An AND gate 471 is connected to the K input of the flip-flop 468. One input of the AND gate 471 receives the IDLE_MODE signal. The other input of the AND gate 471 receives the SHORT_STOP_DETECT signal. The third input of the AND gate 471 receives the inverted output signal provided by the AND gate 470. Thus, if the SHORT_STOP_DETECT signal is detected and the IDLE_MODE signal is negated, the IDLE_MODE signal is negated on the next positive edge of the CLK signal.

In summary, the input logic 404 of the slave circuit 352 includes the circuitry 452 to determine, based on the length of the STOP frame, whether the interrupt serial bus 144 is in the quiet or the continuous mode for the next interrupt cycle. The IDLE_MODE signal is indicative of the mode of the interrupt serial bus 144. If the IDLE_MODE signal is negated, then the slave device 352 can initiate the START frame if a change has occurred in the IRQ signals represented by MAP_IBR_IRQ<15..0>. If the IDLE_MODE signal is asserted, then the slave device 352 cannot initiate the START frame.

The input logic 404 also includes the circuitry 450 to generate the INT_START and EXT_START signals. The assertion of the INT_START signal indicates that a change in the IRQ signals represented by MAP_IBR_IRQ<15..0> has been detected and the interrupt serial bus 144 is in the quiet mode. The EXT_START signal indicates another serial bus device has initiated the START frame.

Figure 15:
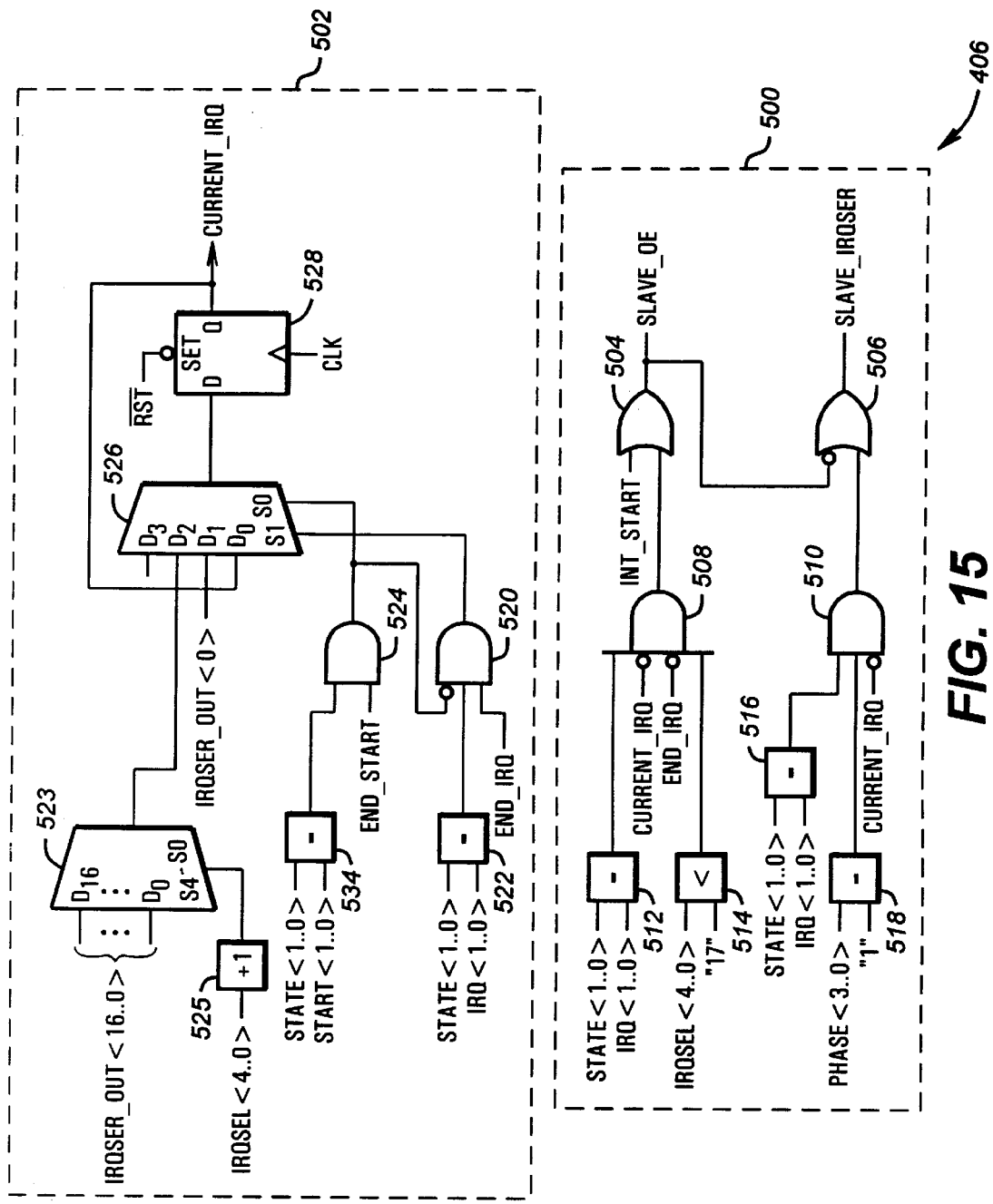
FIG. 15 is a block diagram illustrating the output logic of the slave circuit of FIG. 13.
Figure 16:
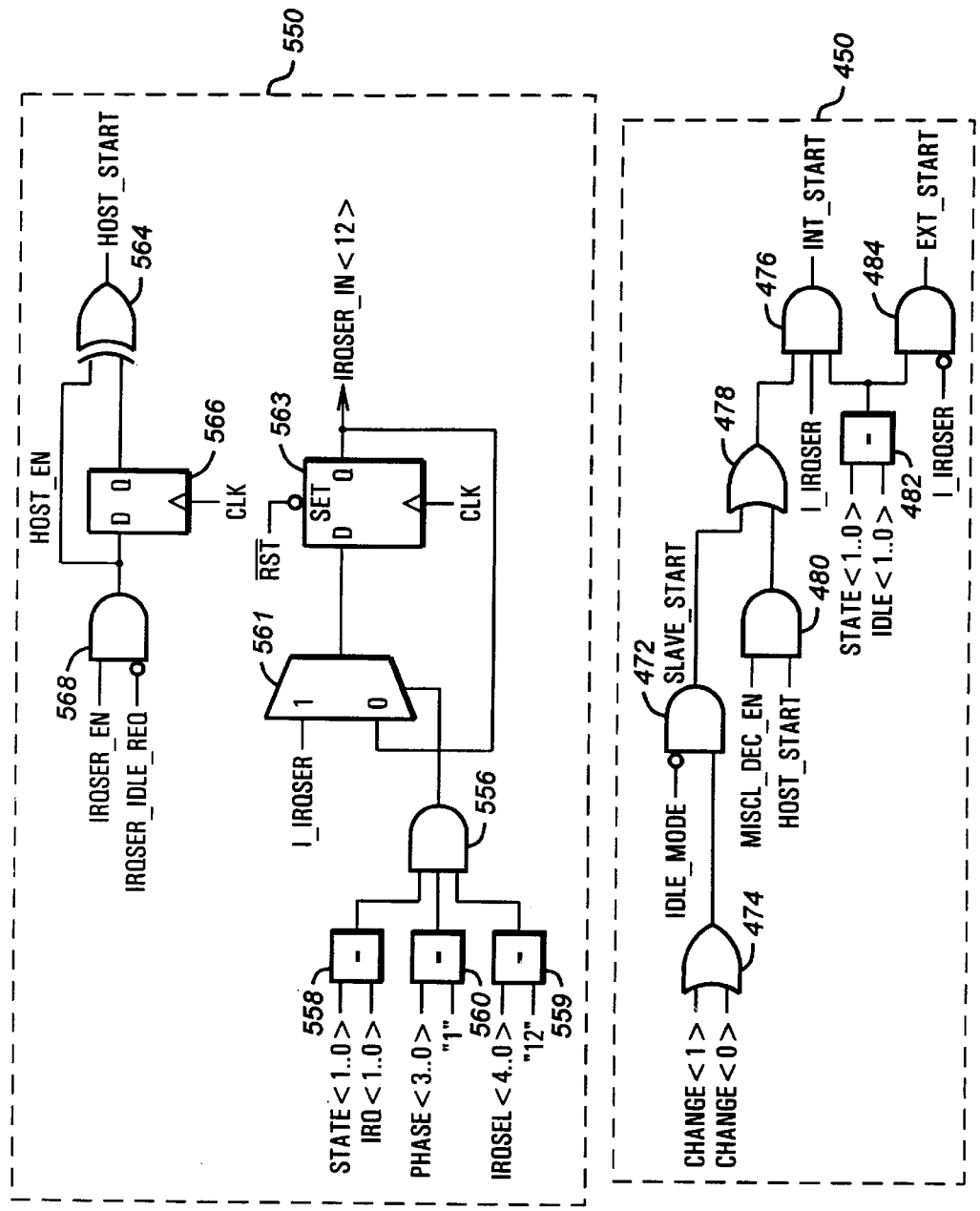
FIG. 16 is a block diagram illustrating the input logic of the host circuit of FIG. 13.

Shown in FIG. 15 is circuitry 502 shared by both the output logic 406 of the slave circuit 352 and the output logic 402 of the host circuit 350 to generate a CURRENT_IRQ signal. The CURRENT_IRQ signal is one cycle of the CLK signal ahead of the actual state of the interrupt serial bus 144. This signal is representative of the current IRQ signal associated with the current IRQ frame of the interrupt cycle. For example, if the current frame of the interrupt cycle is the IRQ12 frame, then the CURRENT_IRQ signal is indicative of the IRQ signal represented by MAP_IBR_IRQ<12>.

The CURRENT_IRQ signal is furnished by the non-inverting output of a D-type flip-flop 528. The flip-flop 528 is clocked by the positive edge of the CLK signal. The set input of the flip-flop 528 is provided with the $\overline{\text{RST}}$ signal.

The D input of the flip-flop 528 is connected to the output of a multiplexor 526. The zero select input of the multiplexor 526 is connected to the output of an AND gate 524, which receives as inputs the END_START signal and the output of an equal circuit 534. The equal circuit 534 compares the STATE<1..0> signal and the START<1..0> parameter.

The multiplexor 526 receives the CURRENT_IRQ signal as its zero input. As further explained below, when the output of the AD gate 524 is high, the first select input of the multiplexor 526 is low, or false. The first input of the multiplexor 526 receives the IRQSER_OUT<0> signal at its first input. Thus, when the end of the START frame is detected, the CURRENT_IRQ signal equals the IRQ signal MAP_IBR_IRQ<0> on the next positive edge of the CLK signal when the IRQ0 frame begins.

For the remaining IRQ frames of the serial interrupt cycle, IRQ1–IRQ15, the output of a multiplexor 523 governs the value of the CURRENT_IRQ signal. The output of the multiplexor 523 is connected to the second input of the multiplexor 526. The first 17 inputs of the multiplexor 523 receive the IRQ signals represented by IRQSER_OUT<16..0>.

The IRQSEL<4..0> signal is provided by the IRQ SER state machine 356 to the input of a plus one circuit 525. The output of the plus one circuit 525 represents the summation of a five bit binary signal representative of "1" with the IRQSEL<4..0> signal. The output of the plus one circuit 525 is provided to the zero through the fourth select inputs of the multiplexor 523.

The inverted output of the AND gate 524 is provided to one input of an AND gate 520. The output of the AND gate 520 is provided to the first select input of the multiplexor 526. Another input of the AND gate 520 receives the END_IRQ signal. The third input of the AND gate 520 is connected to the output of an equal circuit 522. The equal circuit 522 receives the STATE<1..0> signal and the IRQ<1..0> parameter.

Thus, during the IRQ1–15 frames of the interrupt cycle, the CURRENT_IRQ signal is indicative of the IRQ signals associated with these frames. The CURRENT_IRQ signal is asserted one cycle of the CLK signal before the actual IRQ frame. For example, if the IRQ12 signal is asserted, the CURRENT_IRQ signal is negated one cycle of the CLK signal before the beginning of the actual IRQ12 frame on the interrupt serial bus 144.

Also shown in FIG. 15 is the circuitry 500 of the output logic 406 which generates the SLAVE_OE and SLAVE_IRQSER signals. For the serial bus device 348 in a slave device, when the SLAVE_OE signal is asserted, the SLAVE_IRQSER signal is provided to the interrupt serial bus 144 by the interface circuit 354, beginning on the next rising edge of the CLK signal.

The SLAVE_OE signal is provided by the output of an OR gate 504 which receives the INT_START signal at one of its inputs. The inverted SLAVE_OE signal is provided to one input of an OR gate 506 which provides the SLAVE_IRQSER signal at its output. When the INT_START signal is asserted, the other input of the OR gate 506 is negated, as described below, which asserts the SLAVE_IRQSER signal for one cycle of the CLK signal. This initiates a START frame on the interrupt serial bus 144.

The other input of the OR gate 504 is connected to the output of an AND gate 508. One input of the AND gate 508 is connected to the inverted CURRENT_IRQ signal, and another input of the AND gate 508 receives the inverted END_IRQ signal. Another input of the AND gate 508 receives the output of an equal circuit 512. The input to the equal circuit 512 are the STATE<1..0> signal and the IRQ<1..0> parameter.

The AND gate 508 also receives at its fourth input the output of a less-than-circuit 514. The inputs to the less-than-circuit 514 are the IRQSEL<4..0> signal and a five bit signal representative of "17." The IRQSEL<4..0> signal represents the current IRQ frame advanced by one cycle of the CLK signal. If the IRQSEL<4..0> signal is less than "17," the output of the less-than-circuit is asserted. Otherwise, the output of the less-than-circuit 514 is negated. Thus, if the interrupt cycle is in an IRQ frame and the CURRENT_IRQ signal is asserted, the SLAVE_OE signal is asserted.

The other input of the OR gate 506 receives the output of an AND gate 510. One input of the AND gate 510 receives the output of an equal circuit 516. The inputs to the equal circuit 516 are the STATE<1..0> signal and the IRQ<1..0> parameter. Another input of the AND gate 510 is the output of an equal circuit 518. The inputs to the equal circuit 518 are the PHASE<3..0> signal and a 4 bit signal representative of "1." The third input to the AND gate 510 is the inverted CURRENT_IRQ signal.

Figure 20:
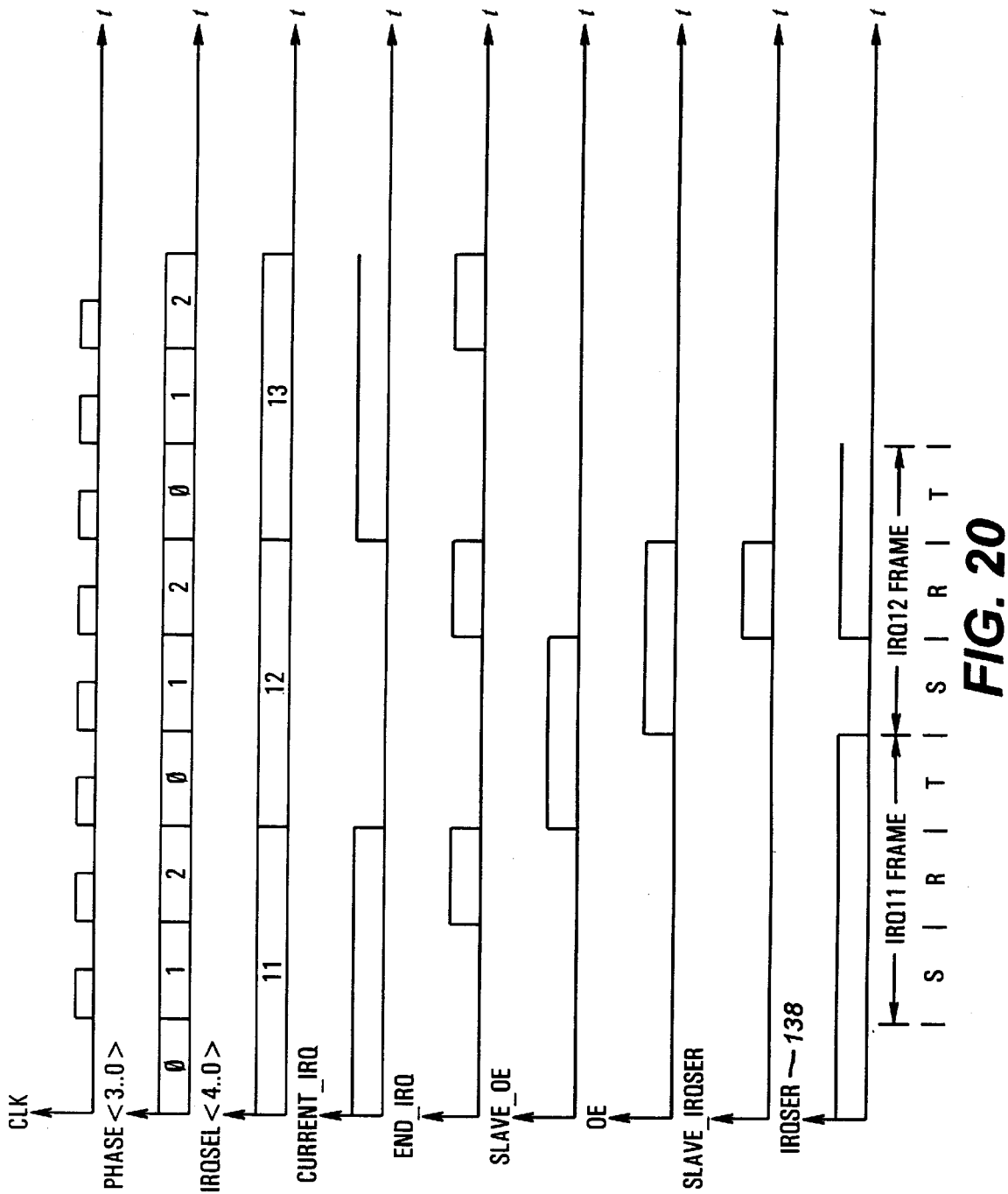
FIG. 20 is a timing diagram illustrating the operation of the interrupt control circuit.

An example for an asserted IRQ12 request is shown in FIG. 20. During the sample and recovery phases of the IRQ12 frame, the SLAVE_OE signal is asserted. During the sample phase of the IRQ12 frame, the SLAVE_IRQSER signal is negated, which causes the assertion of the interrupt serial bus 144. During the subsequent recovery frame of the IRQ12 frame, the SLAVE_IRQSER signal is asserted which deasserts the interrupt serial bus 144.

In summary, the output logic 406 of the slave circuit 352 includes circuitry 500 to generate the SLAVE_OE and the SLAVE_IRQSER signals. In the serial bus device 348 in a slave device, the SLAVE_OEb signal is asserted, which enables the output of the tristate buffer 414, to either initiate a START frame or provide IRQ signals on the interrupt serial bus 144 during an IRQ frame. The SLAVE_IRQSERb signal is negated to either negate the interrupt serial bus 144 during the sample phase of the current IRQ frame or to initiate the START frame of an interrupt cycle.

The output logic 406 also includes circuitry 502 to serially transfer the IRQ signals represented by MAP_IBR_IRQ<15..0> onto the interrupt serial bus 144. The circuitry 502, shared in common with the output logic 402 of the host circuit 350, provides the CURRENT_IRQ signal which represents the IRQ signal of MAP_IBR_IRQ<15..0> that is associated with the current IRQ frame. The CURRENT_IRQ signal is received by the circuitry 500 which provides the SLAVE_OE and SLAVE_IRQSER signals accordingly.

Shown in FIG. 10 is the input logic 400 for the host circuit 350. The circuitry 450 of the input logic 400 shared in common with the input logic 404 of the slave circuit 352 has been described above. Discussed below is the generation of the HOST_START signal and the generation of the IRQ signals, represented by FINAL_IRQ<15..0>a, which are provided by the input logic 400 to the interrupt controller 154.

Now referring to the circuitry 550, an exclusive-OR or XOR gate 564 provides the HOST_START signal which, when asserted, indicates the host circuit 350 has just been enabled. The HOST_START signal is negated otherwise. The host circuit 350 is disabled if a bit of an INTERRUPT_SERIAL_BUS_CONFIG register is negated and enabled if this bit is asserted. The INTERRUPT_SERIAL_BUS_CONFIG register is accessible through the PCI bus 106.

The host circuit 350 is disabled if an IRQSER_IDLE_REQ signal from the MSIO 134 is negated. The negation of this signal is a request for the interrupt serial bus 144 to be placed in an IDLE state. A IRQSER_EN signal, representative of the above-described bit of the INTERRUPT_SIGNAL_BUS_CONFIG register, is provided to the input of an AND gate 568. The other input of the AND gate 568 receives the inverted IRQSER_IDLE_REQ signal.

The output of the AND gate 568 provides a signal HOST_EN to the input of a D-type flip-flop 566 which is clocked by the positive edge of the CLK signal. The HOST_EN signal represents the enablement status of the host circuit 350. The HOST_EN signal is asserted when the host circuit 350 is enabled and negated otherwise. It is to be noted that these signals are irrelevant to the enablement of the host circuit 350 since the host circuit 350 is effectively disabled by the disablement of the output of the host circuit 350 by the interface circuit 354.

The HOST_EN signal is provided to one input of an XOR gate 564 whose other input is connected to the non-inverting output of the flip-flop 566. The output of the XOR gate 564 provides the HOST_START signal. Thus, when the HOST_EN signal is first asserted, the HOST_START signal is asserted for one cycle of the CLK signal. The HOST_START signal is used by the circuitry 450 to initiate a START frame on the serial interrupt bus, as described above.

A portion of the circuitry 550 is used to receive the IRQ signals presented in an interrupt cycle of the interrupt serial bus 144. These IRQ signals are represented by IRQSER_IN<16..0>.

The IRQ signal represented by IRQSER_IN<12> signal is provided by the output of a D-type flip-flop 563 which is clocked by the positive edge of the CLK signal. The set input of the flip-flop 563 receives the $\overline{RST}$ signal, and the input of the flip-flop 563 is connected to the output of a multiplexor 561. The zero input of the multiplexor 561 is connected to the IRQSER_IN<12> signal. The one input of the multiplexor 561 receives the I_IRQSER signal. The select input of the multiplexor 561 is connected to the output of an AND gate 556.

The AND gate 556 has one input connected to the output of an equal circuit 558. Another input of the AND gate 556 is connected to the output of an equal circuit 560. The third input of the AND gate 556 is connected to the output of an equal circuit 559.

The equal circuit 558 receives the STATE<1..0> signal and the IRQ<1..0> parameter. The equal circuit 560 receives the PHASE<3..0> signal and a four bit signal representative of "1." The equal circuit 559 receives the IRQSEL<4..0> signal and a five bit signal representative of "12."

Now referring to FIG. 20, when the interrupt cycle of the interrupt serial bus 144 is in a sample phase of an IRQ frame (PHASE<3..0>="1") and the IRQSEL<4..0> signal is equal "12," the IRQSER_IN<12> signal is equal to the I_IRQSER signal. The other IRQ signals represented by IRQSER_IN<16..0> are generated in a similar fashion, the only difference being the five bit number compared with the IRQSEL<4..0> signal at the input of the equal circuit 559.

In summary, the input logic 400 of the host circuit 350 includes the circuitry 550 to serially receive the IRQ signals presented during the interrupt cycle of the interrupt serial bus 144. The shift register 552 serially receives the IRQ signals. The contents of the shift register 552a provides the IRQ signals presented to the interrupt controller 154.

The input logic 400 of the host circuit 350 further includes circuitry to generate the HOST_START signal which indicates whether the host device 350 has just been enabled. When this occurs the host circuit 350 in a host device initiates an interrupt cycle to update the IRQ signals represented by FINAL_IRQ<15..0>. The circuitry 450 shared in common with the input logic 404 of the slave circuit 352 has been described above.

Figure 17:
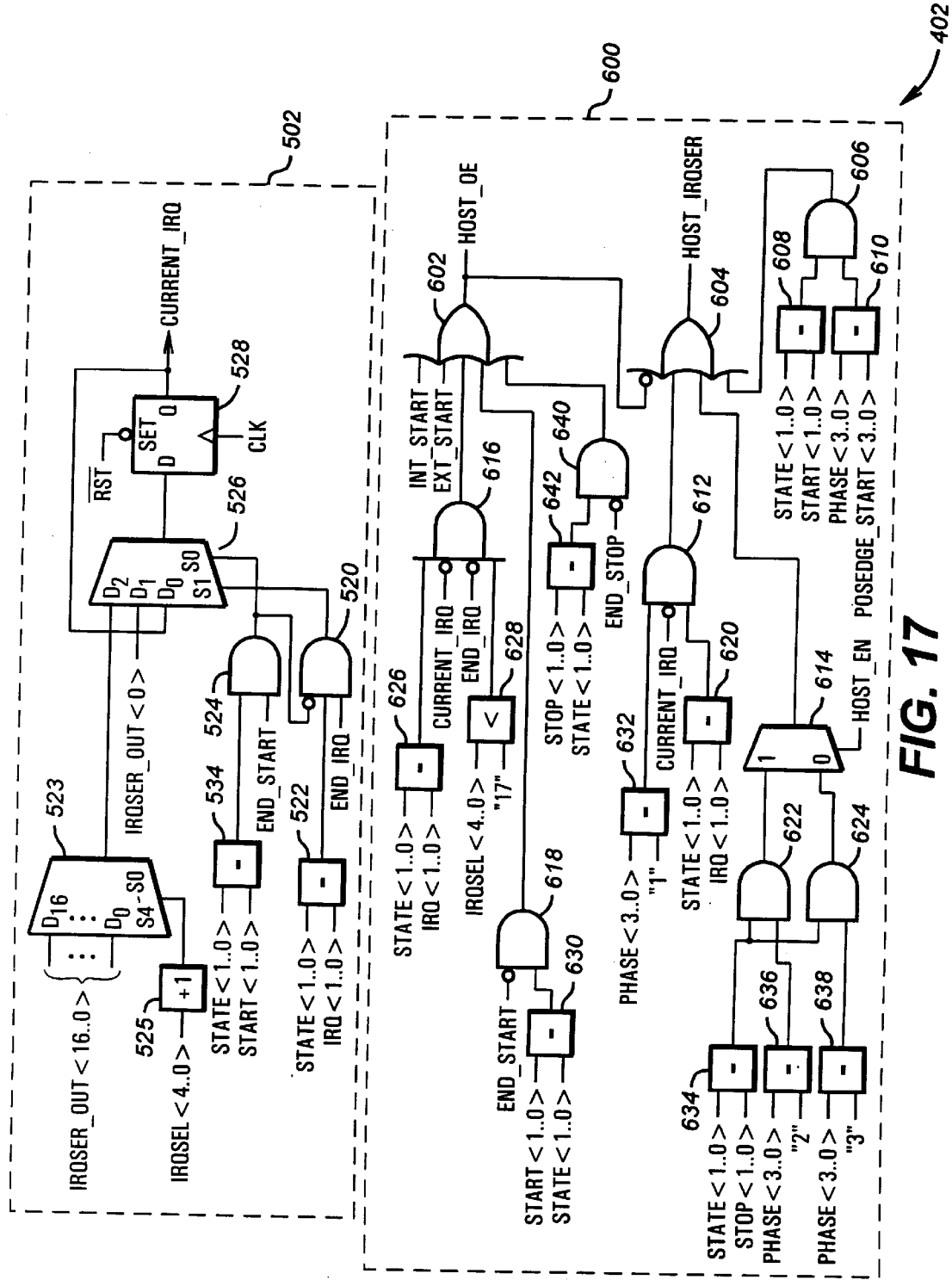
FIG. 17 is a block diagram illustrating the output logic of the host circuit of FIG. 13.

FIG. 17 illustrates the circuitry of the output logic 402 of the host circuit 350. The circuitry 502 of the output logic 402 of the host circuit 350 which is shared in common with the output logic 406 of the slave circuit 352 has already been discussed above. The generation of the HOST_OE and HOST_IRQSER signals by the output logic 402 of the host circuit 350 is further discussed below.

As shown in circuitry 600, the HOST_OE signal is provided by the output of an OR gate 602. One input of the OR gate 602 receives the INT_START signal. This allows the host output logic 402 to initiate the START frame when the INT_START signal is asserted. Another input to the OR gate 602 is the EXT_START signal. This signal allows the output logic 402 to drive the START frame when the EXT_START signal is asserted.

Another input of the OR gate 602 is connected to the output of an AND gate 616. One input of the AND gate 616 is connected to the output of an equal circuit 626 which has as its inputs the STATE<1..0> signal and the IRQ<1..0> parameter. The AND gate 616 also receives the inverted CURRENT_IRQ signal and the inverted END_IRQ signal. The fourth input of the AND gate 616 receives the output of a less-than-circuit 628 which has as its inputs the IRQSEL<4..0> signal and a 5 bit signal representative of "17." Thus, similar to the assertion of the SLAVE_OE signal by the output logic 406 for this case, when an interrupt request exists for an IRQ frame present in the interrupt cycle of the interrupt serial bus 144, the HOST_OE signal is asserted during the sample and recovery phases of that frame.

Another input of the OR gate 602 is connected to the output of an AND gate 640. One input of the AND gate 640 is connected to an equal circuit 642 which has as its inputs the STOP<1..0> parameter and the STATE<1..0> signal. The other input of the AND gate 640 receives the inverted END_STOP signal from the IRQSER state machine 356. Thus, during the STOP frame of the interrupt cycle, the HOST_OE signal is asserted which enables the host circuit 350.

Another input of the OR gate 602 is connected to the output of an AND gate 618. One input of the AND gate 618 receives the inverted END_START signal from the IRQSER state machine 356. The other input of the AND gate 618 is connected to the output of an equal circuit 630 which has as its inputs the START<1..0> parameter and the STATE<1..0> signal. Thus, during the START frame of the interrupt serial bus 144, the HOST_OE signal is asserted which enables the host circuit 350.

The HOST_IRQSER signal is provided by the output of an OR gate 604. All the inputs of the OR gate 604 must be equal to "0" in order for the HOST_IRQSER signal to be negated and the interrupt serial bus 144 asserted. It is to be noted that when tristated, the interrupt serial bus 144 is high, and an interrupt request is indicated by the assertion of the serial interrupt bus during the sample phase of an IRQ frame.

One input of the OR gate 604 is connected to the inverted HOST_OE signal. Another input of the OR gate 604 is connected to the output of an AND gate 612. One input of the AND gate 612 is connected to the output of an equal circuit 632 which has as its inputs the PHASE<3..0> signal and a 4 bit signal representative of "1." Another input of the AND gate 612 receives the inverted CURRENT_IRQ signal. Furthermore, a third input of the AND gate 612 receives the output of an equal circuit 620 which has as its inputs the STATE<1..0> signal and the IRQ<1..0> parameter. Thus, similar to the assertion of the SLAVE_IRQSER signal by the output logic 406 for this case, if during a sample phase of an IRQ frame the CURRENT_IRQ signal is asserted, the HOST_IRQSER signal is negated. For this case, the HOST_IRQSER signal is then asserted during the subsequent recovery phase.

Another input to the OR gate 604 is connected to the output of a multiplexor 614. The select input of the multiplexor 614 receives the HOST_EN signal. The zero input of the multiplexor 614 is connected to the output of an AND gate 624. One input of the AND gate 624 is connected to the output of an equal circuit 634 which receives as its inputs the STATE<1..0> signal and the STOP<1..0> parameter. The other input of the AND gate 624 is connected to the output of an equal circuit 638 which receives at its inputs the PHASE<3..0> signal and a 4 bit signal representative of "3." Thus, if the host circuit 350 is disabled by the negation of the HOST_EN signal, the STOP frame consists of three cycles of the CLK signal. The assertion of the interrupt serial bus 144 for three cycles of the CLK signal during the STOP frame indicates to all slave devices on the interrupt serial bus 144 that the interrupt serial bus 144 is in the continuous mode for the next interrupt cycle, thereby effectively idling the interrupt serial bus 144.

The one input of the multiplexor 614 is connected to the output of an AND gate 622. One input of the AND gate 622 is connected to the output of the equal circuit 634 as described above. The other input of the AND gate 622 is connected to the output of an equal circuit 636 which has as its inputs the PHASE<3..0> signal and a 4 bit signal representative of "2." Thus, if the host circuit 350 in a host device is enabled by the assertion of the HOST_EN signal, the interrupt serial bus 144 is asserted for two cycles of the CLK signal during the STOP frame of the interrupt serial bus 144. This indicates to other slave devices that the interrupt serial bus 144 is in the quite mode for the next interrupt cycle.

Another input of the OR gate 604 is connected to the output of an AND gate 606. One input of the AND gate 606 is connected to the output of an equal circuit 608 which has inputs the STATE<1..0> signal and the START<1..0> parameter. The other input of the AND gate 606 is connected to the output of an equal circuit 616 which has as its inputs the PHASE<3..0> signal and a 4 bit POSEDGE_START<3..0> parameter.

The POSEDGE_START<3..0> parameter is determined from a START frame width parameter, START_WIDTH, which is selectible through the INTERRUPT_SERIAL_BUS_CONFIG register. The START_WIDTH parameter specifies the length of the START frame in terms of the number of cycles of the CLK signal. The POSEDGE_START<3..0> parameter is equal to the START_WIDTH parameter minus one. Thus, the interrupt serial bus 144 is negated for the START_WIDTH number of CLK cycles when the host circuit 350 in a host device drives the START frame.

In summary, the output logic 402 of the host circuit 350 includes circuitry 600 to initiate a START frame, drive a START frame, drive the IRQ frames and drive the STOP frame of the interrupt serial bus 144. The output logic 402 of the host circuit 350 accomplishes this through the HOST_OE and HOST_IRQSER signals. The HOST_OE signal enables the tristate buffer 414 which receives the HOST_IRQSER signal. The circuitry 502 for receiving the IRQ signals presented during an interrupt cycle has been described above.

Figure 18:
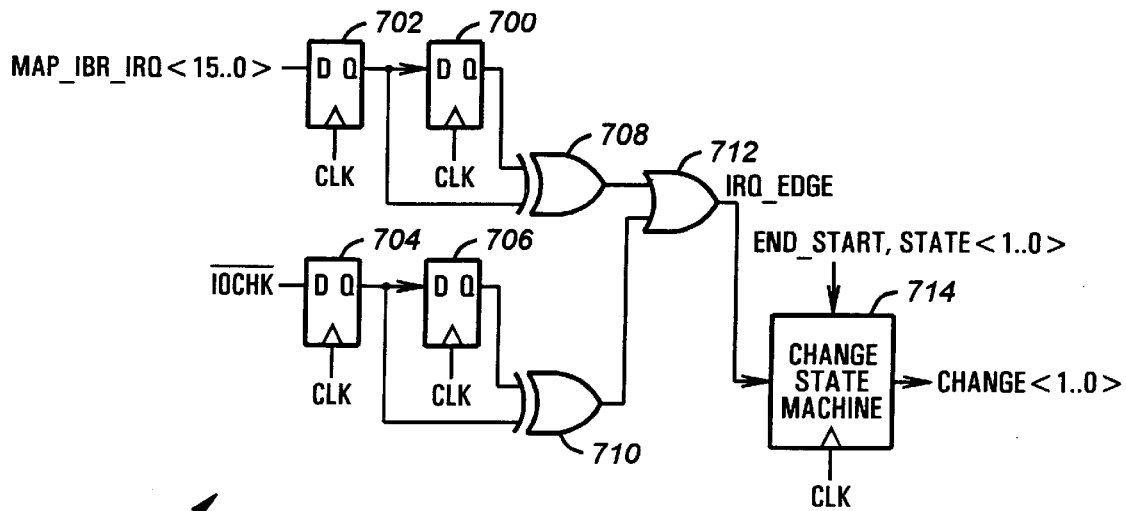
FIG. 18 is a block diagram illustrating the change detection circuit of FIG. 13.

In order to detect a change in the IRQ signals represented by MAP_IBR_IRQ<15..0>, the change detection circuit 360 compares these IRQ signals for two different cycles of the CLK signal in order to detect a transition. As shown in FIG. 18, the IRQ signals represented by MAP_IBR_IRQ<15..0> are provided to the input of a D-type flip-flop 702 which is clocked by the positive edge of the CLK signal. The non-inverting output of the flip-flop 702 is provided to the input of a D-type flip-flop 700 which is clocked by the positive edge of the CLK signal. Both flip-flops 700 and 702 perform bitwise operations.

The non-inverting outputs of the flip-flops 700 and 702 are provided as inputs to sixteen XOR gates 708. The outputs of the XOR gates 708 is provided to one input of a 17 input OR gate 712.

The change detection circuit 360 also detects changes in the $\overline{IOCHCK}$ signal. The $\overline{IOCHCK}$ signal is provided to the input of a D-type flip-flop 704 which is clocked on the positive edge of the CLK signal. The non-inverting output of the flip-flop 704 is provided to the input of a D-type flip-flop 706 which is clocked on the positive edge of the CLK signal. The non-inverting outputs of the flip-flops 704 and 706 are provided to the inputs of an XOR gate 710. The output of the XOR gate 710 is provided to the other input of the OR gate 712.

The output of the OR gate 712 provides an IRQ_EDGE signal which is indicative of whether a change has occurred in either the IRQ signals represented by MAP_IBR_IRQ<15..0> or the $\overline{IOCHCK}$ signal. If a change has occurred in any of these signals, then the IRQ_EDGE signal is asserted; however, if none of these signals have changed within the last cycle of the CLK signal, then the IRQ_EDGE signal is negated.

The IRQ_EDGE signal is received by a change state machine 714 which is clock on the positive edge of the CLK signal. The change state machine 714 provides the 2 bit CHANGE<1..0> signal. When any bit of the CHANGE<1..0> signal is set, this indicates that another interrupt cycle should be initiated in the interrupt serial bus 144.

Figure 19:
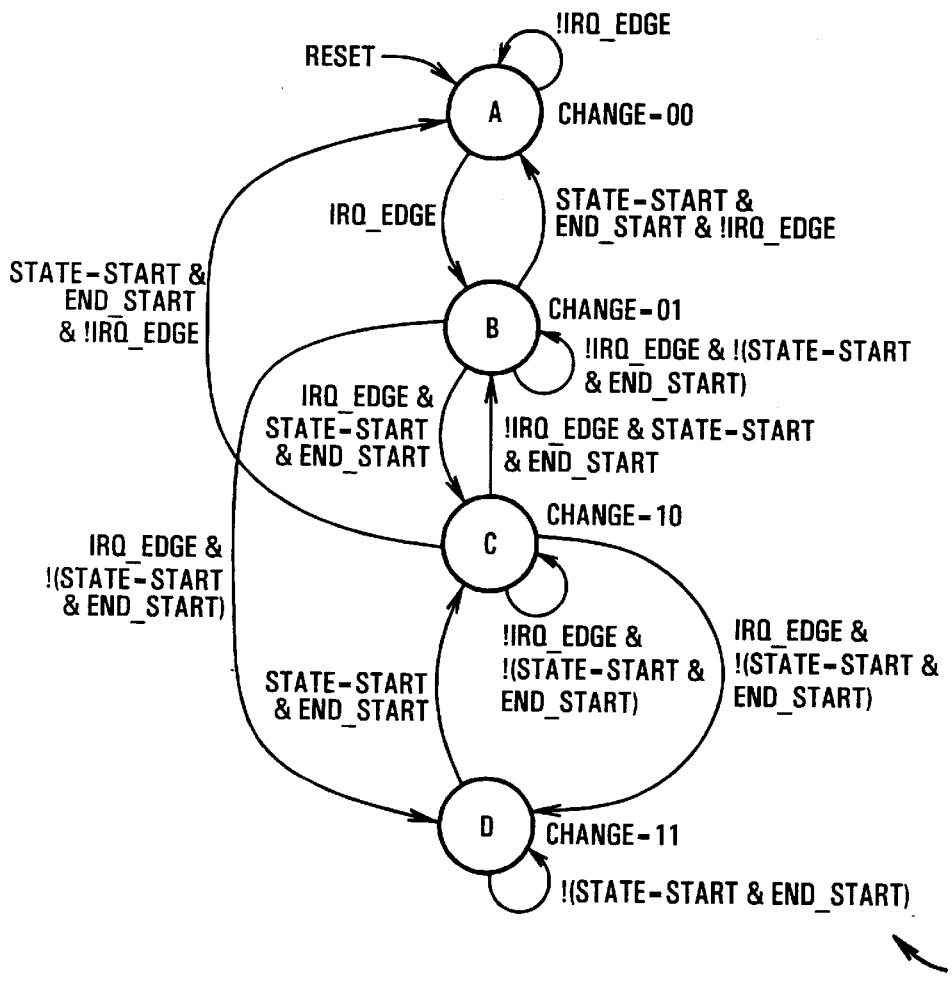
FIG. 19 is a state diagram illustrating operation of the change state machine of FIG. 18.

Shown in FIG. 19 is a state diagram illustrating operation of the change state machine 714. Upon reset, the change state machine 714 enters state A. At state A, the CHANGE<1..0> signal is equal to "b00," where the prefix "b" denotes a binary number. As long as the IRQ_EDGE signal is negated, the change state machine 714 remains at state A. The last bit set of the CHANGE<1..0> signal by the change state machine 714 is cleared at the end of the START frame as indicated by the END_START signal provided by the IRQSER state machine 356.

If the IRQ_EDGE signal is asserted, then the change state machine 714 transitions from state A to state B wherein the change state machine 714 sets the CHANGE<1..0> signal equal to "b01." If the end of the START frame is detected before the IRQ_EDGE signal is asserted again indicating another change in the IRQ signals, then control transfers from state B back to state A wherein the CHANGE<1..0> signal is set equal to "b00."

If the IRQ_EDGE signal is asserted before the end of the START frame, then control transfers from state B to state D wherein the CHANGE<1..0> signal is set equal to "b11." If the end of the START frame is not detected and the IRQ_EDGE signal is negated, then the change state machine 714 remains in state B.

If the IRQ_EDGE signal is asserted and the end of the START frame is detected at the same time, then control transfers from state B to state C wherein the change state machine 714 sets the CHANGE<1..0> signal equal to "b10." If the end of the START frame is detected and the IRQ_EDGE signal is negated, then control transfers from state C back to state A. If the IRQ_EDGE signal is negated and the end of the START frame is not detected, then the change state machine 714 remains in state C. If the IRQ_EDGE signal is asserted and the end of the START frame is not detected, then control transfers from state C to state D.

In state D, the change state machine 714 sets the CHANGE<1..0> signal equal to "b11." The change state machine 714 remains in state D until the end of the START frame is detected by the IRQSER state machine 356. When this occurs, control transfers from state D back to state C, as described above.

In summary, the change detection circuit 360 provides the CHANGE<1..0> signal. If any bit of the CHANGE<1..0> signal is set, then a START frame needs to be initiated to transfer the new IRQ signals to the interrupt serial bus 144. The last bit set in the CHANGE<1..0> signal is cleared at the end of the START frame as indicated by the END_START signal provided by the IRQSER state machine 356. After this time, another interrupt cycle is initiated to ensure the current status of the IRQ signals represented by MAP_IBR_IRQ<15..0> are presented on the interrupt serial bus 144.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spit of the invention.

What is claimed is:

1. A computer system, comprising:
   first and second buses providing for expansion;
   a processor for handling interrupt requests, said processor coupled to said first bus;
   a disk drive coupled to said processor for storing data;
   a device coupled to said second bus, said device generating an interrupt request;
   a write posting buffer disposed between said first and second buses for accepting write operations from the first bus to said device, said write posting buffer having a buffer empty output;
   an interrupt controller coupled to said device and to the processor, said interrupt controller receiving the interrupt request and transmitting said interrupt request to the processor, said interrupt controller adapted to receive an interrupt control command from the processor; and
   an interrupt command blocker coupled to said first bus, said buffer empty output and said interrupt controller, said interrupt command blocker blocking the interrupt control command from the processor over said first bus to said interrupt controller in response to said buffer empty output being false.

2. The computer system of claim 1, wherein said first bus is a Peripheral Component Interconnect (PCI) bus and said second bus is an Industry Standard Architecture (ISA) bus.

3. The computer system of claim 1, wherein the interrupt control command is an end-of-interrupt command.

4. The computer system of claim 3, wherein said interrupt controller is responsive to said end-of-interrupt command to end the interrupt handling sequence.

5. The computer system of claim 1, wherein the interrupt control command is a read interrupt request register command.

6. The computer system of claim 1, wherein said interrupt controller is an 8259-compatible programmable interrupt controller.

7. The computer system of claim 1, wherein said interrupt controller comprises two 8259-compatible programmable interrupt controllers cascaded together.

8. The computer system of claim 1, wherein said interrupt command blocker blocks the interrupt control command to said interrupt controller for a predetermined delay period after said buffer empty output becomes true.

9. The computer system of claim 8, wherein said first bus is a PCI bus that has a PCI clock and wherein said predetermined delay period spans fifteen PCI clock periods.

10. The computer system of claim 1, wherein said interrupt command blocker further comprises a means for retrying the interrupt control command, said retrying means coupled to said first bus, said retrying means causing the first bus to retry the interrupt control command from the processor to the interrupt controller until said buffer empty output becomes true.

11. The computer system of claim 10, further comprising:
    a long-latency interrupt bus for transmitting the interrupt request to the processor;
    a means for asserting a delay after said buffer empty output becomes true; and
    a means for determining when said long-latency interrupt bus is idle after the completion of said delay,
    wherein said interrupt command blocker further blocks the interrupt control command in response to said determining means.

12. The computer system of claim 11, wherein said long-latency interrupt bus is an interrupt serial (IRQSER) bus.

13. The computer system of claim 11, wherein said interrupt request is serialized before being transmitted over said long-latency interrupt bus and wherein said interrupt controller has a plurality of interrupt inputs, further comprising:
    a means for converting said serial transmission into the respective interrupt input to be presented to said interrupt controller.

14. The computer system of claim 11, wherein said retrying means causes the first bus to retry the interrupt control command from the processor to the interrupt controller until said posting buffer is empty and said long-latency interrupt bus is idle.

15. The computer system of claim 11, wherein said interrupt command blocker waits for a predetermined period after said long latency interrupt bus becomes idle before allowing the interrupt control command to pass to said interrupt controller.

16. The computer system of claim 15, wherein said predetermined period is equal to at least two back-to-back interrupt serial bus cycles.

17. A computer system, comprising:

first and second buses providing for expansion;

a processor for handling interrupt requests, said processor coupled to said first bus;

a disk drive coupled to said processor for storing data;

a long latency interrupt bus for communicating interrupt requests to the processor;

a device coupled to said second bus and said long latency interrupt bus, said device generating and transmitting an interrupt request over said long latency interrupt bus;

an interrupt controller coupled to said long latency interrupt bus and to the processor, said interrupt controller receiving the interrupt request and transmitting said interrupt request to the processor, said interrupt controller adapted to receive an interrupt control command from the processor; and an interrupt command blocker coupled to said first bus, said long latency interrupt bus and said interrupt controller, said interrupt command blocker blocking the interrupt control command from the processor over said first bus to said interrupt controller in response to said long latency interrupt bus not being idle.

18. The computer system of claim 17, wherein said first bus is a Peripheral Component Interconnect (PCI) bus and said second bus is an Industry Standard Architecture (ISA) bus.

19. The computer system of claim 17, wherein said long latency interrupt bus is an interrupt serial (IRQSER) bus.

20. The computer system of claim 17, wherein the interrupt control command is an end-of-interrupt command.

21. The computer system of claim 20, wherein said interrupt controller is responsive to said end-of-interrupt command to end the interrupt handling sequence.

22. The computer system of claim 17, wherein said interrupt controller is an 8259-compatible programmable interrupt controller.

23. The computer system of claim 17, wherein said interrupt controller comprises two 8259-compatible programmable interrupt controllers cascaded together.

24. The computer system of claim 17, wherein said interrupt command blocker delays the interrupt control command to said interrupt controller by a predetermined delay period after said long latency interrupt bus is idle.

25. The computer system of claim 24, wherein said predetermined delay period is equal to at least two back-to-back interrupt serial bus cycles.

26. The computer system of claim 17, wherein said interrupt command blocker further comprises a means for retrying the interrupt control command, said retrying means coupled to said first bus, said retrying means causing the first bus to retry the interrupt control command from the processor to the interrupt controller until said long latency interrupt bus becomes idle.

27. The computer system of claim 26, further comprising:

a write posting buffer disposed between said first and second buses for accepting write operations from the first bus to said device, said posting buffer having a buffer empty output, wherein said interrupt command blocker blocks the interrupt control command to said interrupt controller until said buffer empty output becomes true and said long latency interrupt bus becomes idle.

28. The computer system of claim 17, further comprising a:

a write posting buffer disposed between said first and second buses for accepting write operations from devices on the first bus to devices on said second bus, said posting buffer having a buffer empty output, wherein said interrupt command blocker blocks the interrupt control command to said interrupt controller until said buffer empty output becomes true and said long latency interrupt bus becomes idle.

29. The computer system of claim 28, wherein said interrupt command blocker waits for a predetermined period after said buffer empty output becomes true before waiting for said long latency interrupt bus to become idle.

30. The computer system of claim 29, wherein said first bus is a PCI bus that has a PCI clock and wherein said predetermined period is equal to at least 15 PCI bus cycles.

31. The computer system of claim 19, wherein said IRQSER bus spans between an expansion base unit and a portable computer.

32. An apparatus for synchronizing commands to an interrupt controller, the apparatus for use in a system having:

first and second buses providing for expansion;

a processor for handling interrupt requests, said processor coupled to said first bus;

a device coupled to said second bus, said device generating an interrupt request;

a write posting buffer disposed between said first and second buses for accepting write operations from the first bus to said device, said write posting buffer having a buffer empty output; and an interrupt controller coupled to said device and to the processor, said interrupt controller receiving the interrupt request and transmitting said interrupt request to the processor, said interrupt controller adapted to receive an interrupt control command from the processor, the apparatus comprising:

an interrupt command blocker for coupling to said first bus, said buffer empty output and said interrupt controller, said interrupt command blocker for blocking the interrupt control command from the processor over said first bus to said interrupt controller in response to said buffer empty output being false.

33. An apparatus for synchronizing commands to an interrupt controller, the apparatus for use in a system having:

first and second buses providing for expansion;

a processor for handling interrupt requests, said processor coupled to said first bus;

a long latency interrupt bus for communicating interrupt requests to the processor;

a device coupled to said second bus and said long latency interrupt bus, said device generating and transmitting an interrupt request over said long latency interrupt bus; and an interrupt controller coupled to said long latency interrupt bus and to the processor, said interrupt controller receiving the interrupt request and transmitting said interrupt request to the processor, said interrupt controller adapted to receive an interrupt control command from the processor, the apparatus comprising:

an interrupt command blocker for coupling to said first bus, said long latency interrupt bus and said interrupt controller, said interrupt command blocker for blocking the interrupt control command from the processor over said first bus to said interrupt controller in response to said long latency interrupt bus not being idle.

34. A computer system, comprising:

first and second buses providing for expansion;

a processor for handling interrupt requests, said processor coupled to said first bus;

a display coupled to said processor for communicating with a user;

a device coupled to said second bus, said device generating an interrupt request;

a write posting buffer disposed between said first and second buses for accepting write operations from the first bus to said device, said write posting buffer having a buffer empty output;

an interrupt controller coupled to said device and to the processor, said interrupt controller receiving the interrupt request and transmitting said interrupt request to the processor, said interrupt controller adapted to receive an interrupt control command from the processor; and an interrupt command blocker coupled to said first bus, said buffer empty output and said interrupt controller, said interrupt command blocker blocking the interrupt control command from the processor over said first bus to said interrupt controller in response to said buffer empty output being false.

35. A computer system, comprising:

first and second buses providing for expansion;

a processor for handling interrupt requests, said processor coupled to said first bus;

a display coupled to said processor for communicating with a user;

a long latency interrupt bus for communicating interrupt requests to the processor;

a device coupled to said second bus and said long latency interrupt bus, said device generating and transmitting an interrupt request over said long latency interrupt bus;

an interrupt controller coupled to said long latency interrupt bus and to the processor, said interrupt controller receiving the interrupt request and transmitting said interrupt request to the processor, said interrupt controller adapted lo receive an interrupt control command from the processor; and an interrupt command blocker coupled to said first bus, said long latency interrupt bus and said interrupt controller, said interrupt command blocker blocking the interrupt control command from the processor over said first bus to said interrupt controller in response to said long latency interrupt bus not being idle.

* * * * *